US012301737B2

(12) United States Patent
Yang et al.

(10) Patent No.: US 12,301,737 B2
(45) Date of Patent: May 13, 2025

(54) AUTOMATIC SELF CHECKING AND HEALING OF PHYSICALLY UNCLONABLE FUNCTIONS

(71) Applicant: William Marsh Rice University, Houston, TX (US)

(72) Inventors: Kaiyuan Yang, Houston, TX (US); Yan He, Houston, TX (US)

(73) Assignee: William Marsh Rice University, Houston, TX (US)

( * ) Notice: Subject to any disclaimer, the term of this patent is extended or adjusted under 35 U.S.C. 154(b) by 117 days.

(21) Appl. No.: 18/264,369

(22) PCT Filed: Feb. 4, 2022

(86) PCT No.: PCT/US2022/015375
§ 371 (c)(1),
(2) Date: Aug. 4, 2023

(87) PCT Pub. No.: WO2022/170142
PCT Pub. Date: Aug. 11, 2022

(65) Prior Publication Data
US 2024/0106664 A1 Mar. 28, 2024

Related U.S. Application Data

(60) Provisional application No. 63/145,704, filed on Feb. 4, 2021.

(51) Int. Cl.
*H04L 9/32* (2006.01)
(52) U.S. Cl.
CPC ........ *H04L 9/3278* (2013.01); *H04L 2209/26* (2013.01)
(58) Field of Classification Search
CPC .............. H04L 2209/26; H04L 9/3278
See application file for complete search history.

(56) References Cited

U.S. PATENT DOCUMENTS 8,667,265 B1 * 3/2014 Hamlet ................ H04L 9/3278
713/185
9,202,554 B2 * 12/2015 Chu ..................... G11C 29/50
(Continued)

FOREIGN PATENT DOCUMENTS

WO    2015031685 A1    3/2015

OTHER PUBLICATIONS

Li et al.: "A Self-Regulated and Reconfigurable CMOS Physically Unclonable Function Featuring Zero-Overhead Stabilization;" IEEE Journal of Solid-State Circuts; vol. 55; No. 1; Jan. 1, 2020; pp. 98-107 (10 pages).
(Continued)

*Primary Examiner* — Gary S Gracia
(74) *Attorney, Agent, or Firm* — Osha Bergman Watanabe & Burton LLP

(57) ABSTRACT

A method and circuit for an Automatic Self Checking and Healing (ASCH) of Physically Unclonable Functions (PUFs), the method includes: controlling a skew input added to each PUF cell of a PUF array in a circuit with sub-mV resolution; healing a portion of unstable bits of each PUF cells locally; and performing a second self-checking on healed PUF cells to determine final PUF cells to discard. The method further includes performing at least one of a static operation mode, a dynamic operation mode, and a hybrid operation mode of ASCH stabilization system based on design needs to reconfigure and mask the PUF array to achieve less than 1E-8 Bit Error Rate (BER) with less than 25% masking ratio. The circuit includes the skew input, a self-checking controller, a high-speed readout, a validity detector, and a Digital-to-Analog Converter (DAC). Further, each PUF cell in the PUF array is an inverter-based PUF and includes a first stage inverter and a second stage inverter (Continued)

such that the second stage inverter includes other stages except the first stage inverter.

15 Claims, 26 Drawing Sheets

(56) References Cited

U.S. PATENT DOCUMENTS

| | | | | |
|---|---|---|---|---|
| 10,103,733 | B1* | 10/2018 | Gurrieri | H03K 19/00315 |
| 11,784,835 | B2* | 10/2023 | Kudva | H03K 19/17768 |
| | | | | 380/44 |
| 12,131,800 | B2* | 10/2024 | Sinangil | G11C 7/1063 |
| 2013/0196071 | A1* | 8/2013 | Yang | C09D 7/70 |
| | | | | 427/386 |
| 2015/0079290 | A1* | 3/2015 | Yang | C09D 161/24 |
| | | | | 427/331 |
| 2018/0176025 | A1* | 6/2018 | Suresh | H04L 9/3278 |
| 2019/0130103 | A1* | 5/2019 | Shen | H04L 9/3278 |
| 2019/0132137 | A1* | 5/2019 | Zhong | H04L 9/3278 |
| 2019/0165953 | A1* | 5/2019 | Shor | H04W 12/06 |
| 2020/0115568 | A1* | 4/2020 | Yang | C09D 5/00 |
| 2020/0162271 | A1* | 5/2020 | Cambou | H04L 63/0435 |
| 2021/0314176 | A1* | 10/2021 | Cambou | H04L 9/0866 |
| 2021/0328818 | A1* | 10/2021 | Sonntag | G11C 7/24 |
| 2022/0029836 | A1* | 1/2022 | Qureshi | H04L 9/0643 |
| 2022/0131713 | A1* | 4/2022 | Schifmann | H04L 9/3278 |
| 2022/0271752 | A1* | 8/2022 | Kudva | H03K 19/018521 |
| 2023/0195200 | A1* | 6/2023 | Suresh | H03L 7/08 |
| | | | | 713/322 |
| 2024/0106664 | A1* | 3/2024 | Yang | G06F 7/588 |
| 2024/0378270 | A1* | 11/2024 | Hurwitz | H04L 9/0866 |

OTHER PUBLICATIONS

Liu, Kunyang et al.: "A 0.5-V 2.07-fJ/b 497-F2 EE/CMOS Hybrid SRAM Physically Unclonable Function with 1 E-7 Bit Error Rate Achieved through Hot Carrier Injection Burn-in", 2020 IEEE Custom Integrated Circuits Conference (CICC), IEEE, Mar. 22, 2020 (Mar. 22, 2020), pp. 1-4 (4 pages).

International Preliminary Report On Patentability issued in International application No. PCT/US2022/015375 dated Aug. 3, 2023 (8 pages).

* cited by examiner

AUTOMATIC SELF CHECKING AND HEALING OF PHYSICALLY UNCLONABLE FUNCTIONS

CROSS-REFERENCE TO RELATED APPLICATIONS

This Application is based upon and claims the benefit of priority from U.S. Provisional Patent Application No. 63/145,704, filed Feb. 4, 2021, the entire contents of which are incorporated herein by reference.

FIELD OF THE DISCLOSURE

The disclosed invention is in the general field of using a Physically Unclonable Function (PUF) suitable for CMOS technology for low-cost and secure key generation and storage in broad security applications.

BACKGROUND OF THE INVENTION

A Physically Unclonable Function (PUF) is among the most promising types of security primitives, providing low cost solutions for key storage, chip authentication, supply chain protection, and secure communications. A PUF provides a response to a challenge. For a particular device realizing the PUF, a challenge-response pair depends upon the inherent manufacturing variations in that device. A challenge-response pair is known to the manufacturer of the device and is shared among authorized users, but it is extremely difficult or nearly impossible for an unauthorized user to discover the challenge-response pair by analyzing or reverse engineering the device.

A PUF may have only one challenge-response pair. As an example, for a PUF implemented with a circuit, the challenge may be the powering on of the circuit, and the response may be a bit sequence represented by logic-valued voltages within the circuit. The response provided by a PUF can be used to identify the PUF for authentication purposes, or as another example the response can be used to generate a key to decrypt messages. The key may be the response itself, or a hash function can be applied to the response to generate the key.

The development of PUF circuits that are power and area efficient with high dark bit detection accuracy and low operation overhead and that exhibit good reliability and stability, is an area of active research.

BRIEF SUMMARY OF THE INVENTION

In one aspect, embodiments disclosed herein relate to a method for an Automatic Self Checking and Healing (ASCH) of Physically Unclonable Functions (PUFs), the method includes: controlling a skew input added to each PUF cell of a PUF array in a circuit with sub-mV resolution; healing a portion of unstable bits of each PUF cells locally; and performing a second self-checking on healed PUF cells to determine final PUF cells to discard. The method further includes performing at least one of a static operation mode, a dynamic operation mode, and a hybrid operation mode of ASCH stabilization system based on design needs to reconfigure and mask the PUF array to achieve less than 1E-8 Bit Error Rate (BER) with less than 25% masking ratio. The circuit includes the skew input, a self-checking controller, a high-speed readout circuit, a validity detector, and a Digital-to-Analog Converter (DAC). Further, each PUF cell in the PUF array is an inverter-based PUF and includes a first stage inverter and a second stage inverter such that the second stage inverter includes other stages except the first stage inverter.

In another aspect, embodiments disclosed herein generally relate to a circuit for an Automatic Self Checking and Healing (ASCH) of Physically Unclonable Functions (PUFs). The circuit includes a PUF cell, a self-checking controller; a validity detector for automatic detection of unstable cells by checking stability of the PUF cell based on an evaluated PUF bit, an 8-bit resistive Digital-to-Analog Converter (DAC), and an auto-zeroing comparator. The circuit further includes a skew input, a timing control, a power rail, a ground rail, a plurality of a pMOSFET (Metal Oxide Semiconductor Field Effect Transistor), and a plurality of an nMOSFET. The PUF cell further includes a first stage inverter and a second stage inverter such that the second stage inverter includes other stages except the first stage inverter.

In another aspect, embodiments disclosed herein relate to a non-transitory computer readable medium storing instruction. The instructions are executable by a computer processor and include functionality for controlling a skew input added to each Physically Unclonable Function (PUF) cell of a PUF array with sub-mV resolution. The instruction further includes healing a portion of unstable bits of each PUF cells locally and performing a second self-checking on healed PUF cells to determine final PUF cells to discard. The instruction further includes performing at least one of a static operation mode, a dynamic operation mode, and a hybrid operation mode of Automatic Self Checking and Healing (ASCH) stabilization system based on design needs to reconfigure and mask the PUF array to achieve less than 1E-8 Bit Error Rate (BER) with less than 25% masking ratio.

Other aspects and advantages of one or more embodiments disclosed herein will be apparent from the following description and the appended claims.

BRIEF DESCRIPTION OF THE DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

Figure 1:
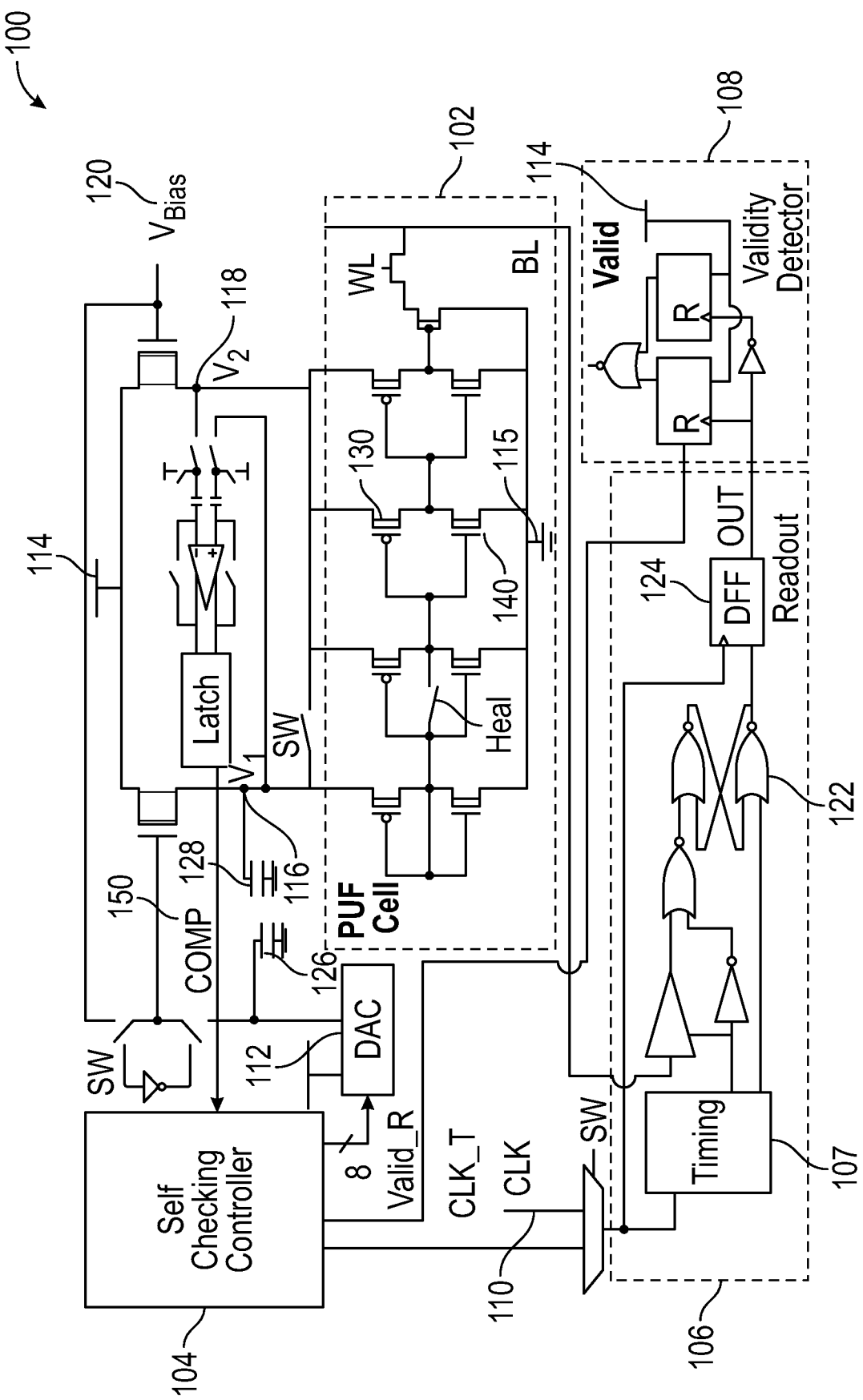
FIG. 1 illustrates an implementation of a self-checking and healing on a single Physically Unclonable Function (PUF) cell in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In the following description, any component described with regard to a figure, in various embodiments of the present disclosure, may be equivalent to one or more like-named components described with regard to any other figure.

For brevity, at least a portion of these components are implicitly identified based on various legends. Further, descriptions of these components will not be repeated with regard to each figure. Thus, each and every embodiment of the components of each figure is incorporated by reference and assumed optionally present within every other figure having one or more like-named components. Additionally, in accordance with various embodiments of the present disclosure, any description of the components of a figure is to be interpreted as an optional embodiment, which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements, if an ordering exists.

The term data structure is understood to refer to a format for storing and organizing data.

In the following description of FIGS. 1-20, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope of the invention should not be considered limited to the specific arrangement of steps shown in the flowcharts.

Although multiply dependent claims are not introduced, it would be apparent to one of ordinary skill that the subject matter of the dependent claims of one or more embodiments may be combined with other dependent claims.

In general, one or more embodiments are directed to a Physically Unclonable Function (PUF) with improved reliability using an Automatic Self Checking and Healing (ASCH) system. In particular, ASCH stabilization system may significantly improve the reliability of near-threshold inverter chain based PUF to achieve <1E-8 Bit Error Rate (BER) with less than 25% masking ratio and without Error Correction Code (ECC). Therefore, embodiments disclosed herein provide an improved PUF with high dark bit detection accuracy and low operation overhead using ASCH stabilization system and to solve the reliability issue of PUF keys under environmental variations, without using expensive ECCs.

Embodiments disclosed herein provide the improved PUF array using three operation modes and their physical implementations of ASCH stabilization system that efficiently and effectively reconfigure and mask the PUF cells to achieve minimum BER with small masking ratio. Embodiments of the invention may be used in any PUF array with ASCH stabilization system for low-cost and secure key generation and storage in broad security applications. Compared with state-of-art designs, one or more embodiments of the invention achieves "0" BER with 4 times smaller masking ratio, which means much smaller overhead. In particular, by locally amplifying the static switching voltage mismatch between neighboring sub-threshold inverters, PUF cell is compact, stable, low power, and more importantly has an almost sole source of mismatch that can be leveraged for self-checking.

In the view of the above, the objective is to implement the ASCH stabilization system which relies on a fast, accurate, low-cost self-checking, and healing stabilization scheme integrated within the PUF array. Self-checking finds the dark bits with a configurable threshold, and the healing step reduces the number of dark bits through in-cell reconfiguration.

FIG. 1 illustrates a scheme 100 implementing a self-checking and healing on a single PUF cell in accordance to one or more embodiments. In particular, the scheme 100 includes a PUF cell 102, a self-checking controller 104, a readout circuit 106, a validity detector 108, a timing control 110, an 8-bit resistive Digital-to-Analog Converter (DAC) 112, and an auto-zeroing comparator 150.

The PUF cell 102 is an inverter-based PUF that demonstrates ultra low power consumption, state-of the art native stability, and compact footprint. The PUF cell 102 further includes a first stage inverter 116 and a second stage inverter 118 such that the second stage inverter 118 includes other stages except the first stage inverter 116. The total number of stages may be any number larger than three. The PUF cell 102 utilizes a native transistor header as a low-cost regulation solution, which enables sub-threshold operation of the PUF cell 102 and improves its resistance to voltage variations. In some embodiments, in order to emulate the change of threshold voltage due to different V/T variation without changing the actual condition, a source of mismatch that tilts the PUF in each direction is required. In the case of inverter-based PUF, the change of threshold voltage manifests as the change of the difference of switching voltage between the first stage 116 and second stage inverter 118. In some embodiment, this change of switching voltage is emulated by controlling a supply voltage, $V_1$, of the first stage inverter 116 using the 8-bit resistive DAC 112. In one or more embodiments, the first stage get a different supply voltage $V_1$ than other stages during self-checking process. The DAC 112 and the auto-zeroing comparator 150 are used to properly generate $V_1$.

In some embodiments, the readout circuit 106 is an SRAM-like peripheral integrated for high-speed parallel readout. The readout circuit 106 samples and output PUF value at every rising clock edge. The validity detector 108 is used for automatic detection of unstable cells by checking if the PUF cell 102 is stable during its evaluation window based on an evaluated PUF bit. It functions by de-asserting the Reset during evaluation, and outputs a "1" from either D-FF 124 if there is an PUF transition. The output NOR gates 122 is "0" if the evaluated bit is unstable, and vice versa.

The scheme 100 further includes a first capacitor 126 and a second capacitor 128. The scheme 100 further includes a supply or a power rail 114 and a ground rail 115. The PUF cell 102 includes a plurality of pMOSFET (Metal Oxide Semiconductor Field Effect Transistor) 130 and a plurality of a nMOSFET 140. In some embodiment, the pMOSFET 130 having a drain connected to the drain of the nMOSFET 140.

In some embodiments, the self-checking process is challenging because of the load imbalance issue. As shown in FIG. 1, during normal operation, both native regulators are biased by an external source 120 $V_{bias}$, and supply voltages of each PUF cell's first stage, $V_1$, and other stages, $V_2$. At the start of checking operation, the native regulator for $V_1$ is biased by the DAC 112, and $V_1$ is isolated from $V_2$. As shown in FIG. 1, this results in an imbalance between $V_1$ and $V_2$ due to the different loading condition. To detect the unstable bits caused by the same amount of intentional mismatch in both directions, $V_1$ value needs to be tuned close to $V_2$ before adding voltage skew based on a skew input.

Figure 2:
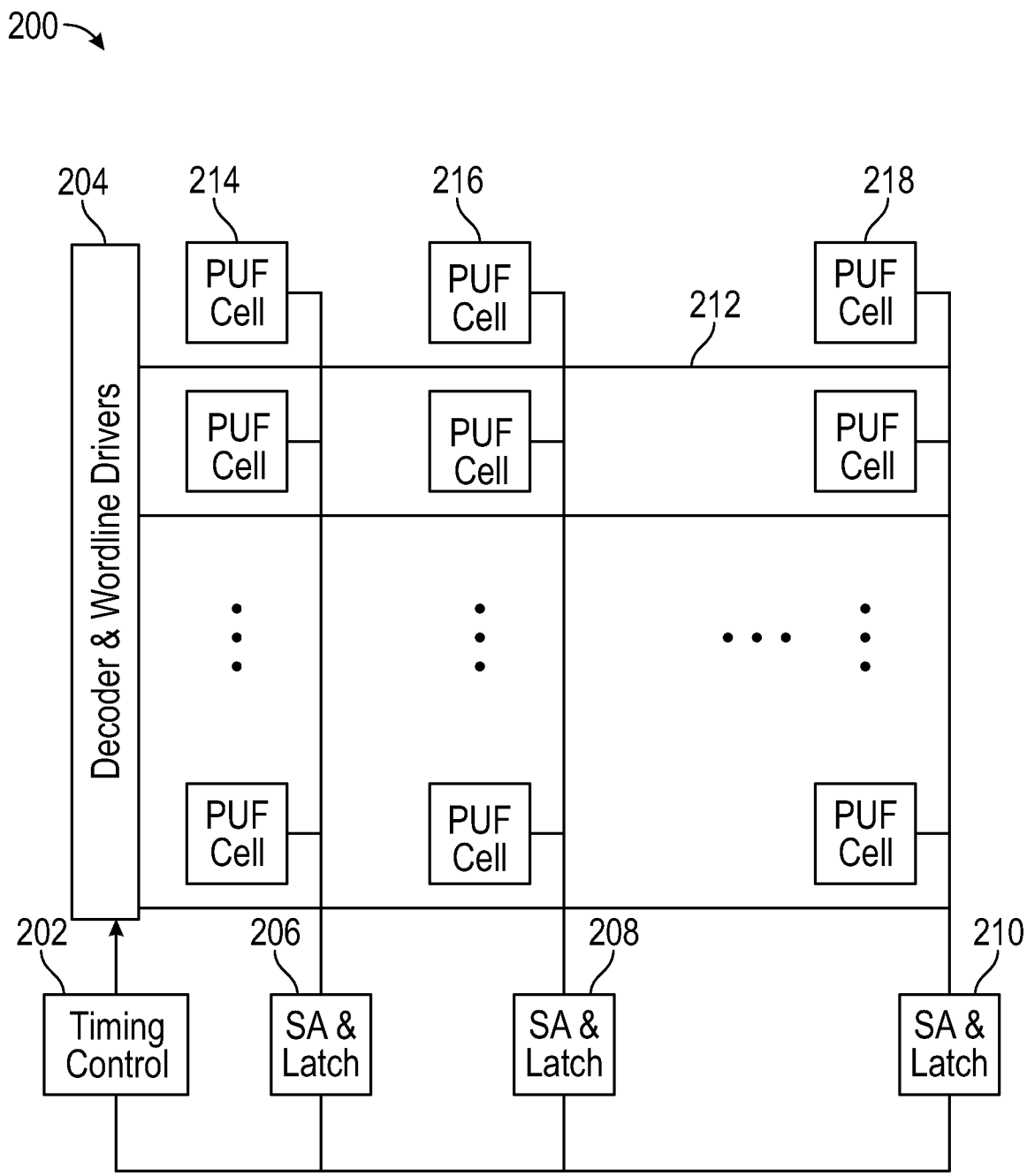
FIG. 2 illustrates an implementation of a crossbar array with the PUF cells of FIG. 1 in accordance with one or more embodiments.

FIG. 2 illustrates a PUF cell array 200, where the PUF cells are according to the embodiments of FIG. 1. The PUF cells are arranged into an array, where the bitlines and wordlines are orientated, respectively, vertically and horizontally with respect to the orientation of the drawing. A timing control unit 202 controls a decoder and wordline driver unit 204 so that wordlines may be de-asserted, one at a time, to read the response bits provided by the PUF cells. The responses are read off of the bitlines. The sense amplifier and latch units, of which three are explicitly shown (206, 208, and 210) read the response bits on the various bitlines and latch the sensed values to provide the response bits. The latched response bits may be processed by other logic circuits (not shown) so that a chip utilizing the PUF cell array may be authenticated, or the response bits may be used to develop a key for encryption or decryption.

The PUF cell array 200 of FIG. 2 may be used to provide multiple responses, depending upon which wordline is de-asserted. For example, when de-asserting the wordline 212, the sense amplifier and latch units read response bits from the PUF cells addressed by the de-asserted wordline, of which three are explicitly shown in FIG. 2: the PUF cell 214, the PUF cell 216, and the PUF cell 218. The circuits for realizing the decoder and wordline driver unit 204 to address a particular row of PUF cells, and the circuits for the sense amplifier and latch units, are similar to well-known circuits used in SRAM memory arrays. Temporal majority voting may be employed whereby the same wordline is de-asserted multiple times, and where the response bits are averaged over time.

Figure 3:
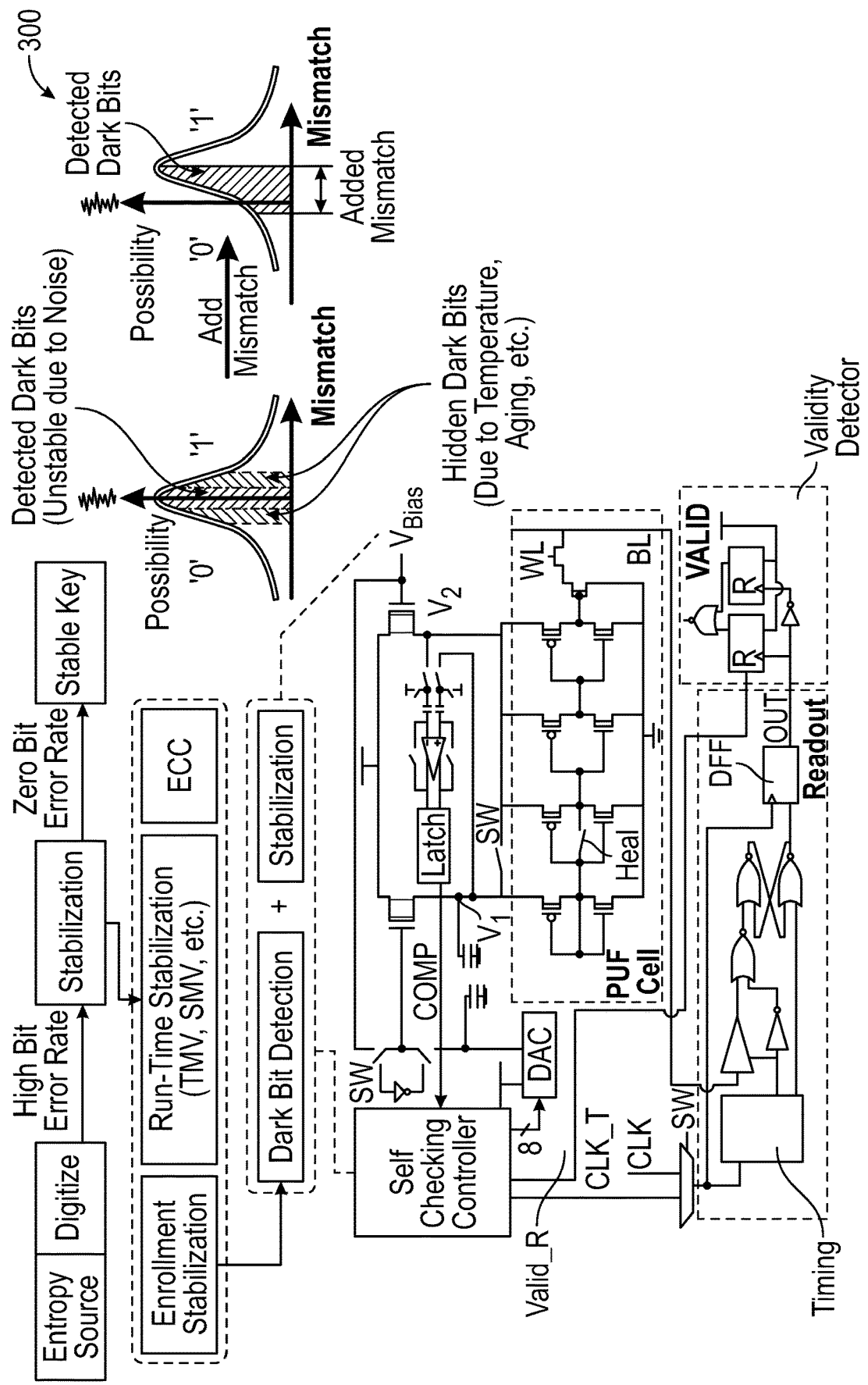
FIG. 3 shows a schematic of types of stabilization techniques (top left), principles of dark bit detection (top right), state-of-the-art implementations, and an Automatic Self Checking and Healing stabilization system (ASCH) (bottom) in accordance with one or more embodiments.

FIG. 3 shows a schematic 300 with types of stabilization techniques (top left), principles of dark bit detection (top right), state-of-the-art implementations, and ASCH stabilization system (bottom right) in accordance with one or more embodiments.

In some embodiments, the principle of ASCH is to modulate the supply voltage difference automatically and accurately between the first and the rest stages in each cell and then healing a large portion of unstable cells with in-situ reconfiguration, as shown in FIG. 3. Therefore, modulating the supply voltage correlates well with the impacts of temperature and voltage on the target PUF.

In some embodiments, ASCH PUF prototype in 65 nm CMOS demonstrates: (1) "0" BER (i.e. zero error in 100M (4096×2000×15×(1-13%)) evaluations) across the automotive temperature range (−40 to 125° C.) and supply voltage variation (0.7 to 1.4 V), by discarding 13% of all bits, representing a more than four times' improvement of detection accuracy over state-of-the-arts; (2) a 32×128 array of 594F2 PUF cells achieving 0.057 fJ/b core energy and 22 Gb/s throughput; (3) a fully-integrated ASCH stabilization system occupying 5150 µm² area and taking 2 ms to process the whole array; (4) three different mode of operation for ASCH to select from based on design needs.

In some embodiments, a key requirement of ASCH stabilization system is to accurately control the intentional skew ($V_{skew}$) added to the near-threshold supply voltages of each PUF cell's first stage ($V_1$) and other stages ($V_2$), with sub-mV resolution. Because of the very low load current of the PUF cells, standard analog or digital LDOs will incur huge power and area overhead to achieve the required high-resolution voltage control. Instead, the native transistor-based regulator is adopted, which enables fine regulated voltage control by adjusting the native transistors' gate voltages ($V_{N1}$, $V_{N2}$) with no extra quiescent power. However, process variations of native transistors and different load conditions in normal and self-checking modes complicates the accurate control of $V_{skew}$.

Figure 4A:
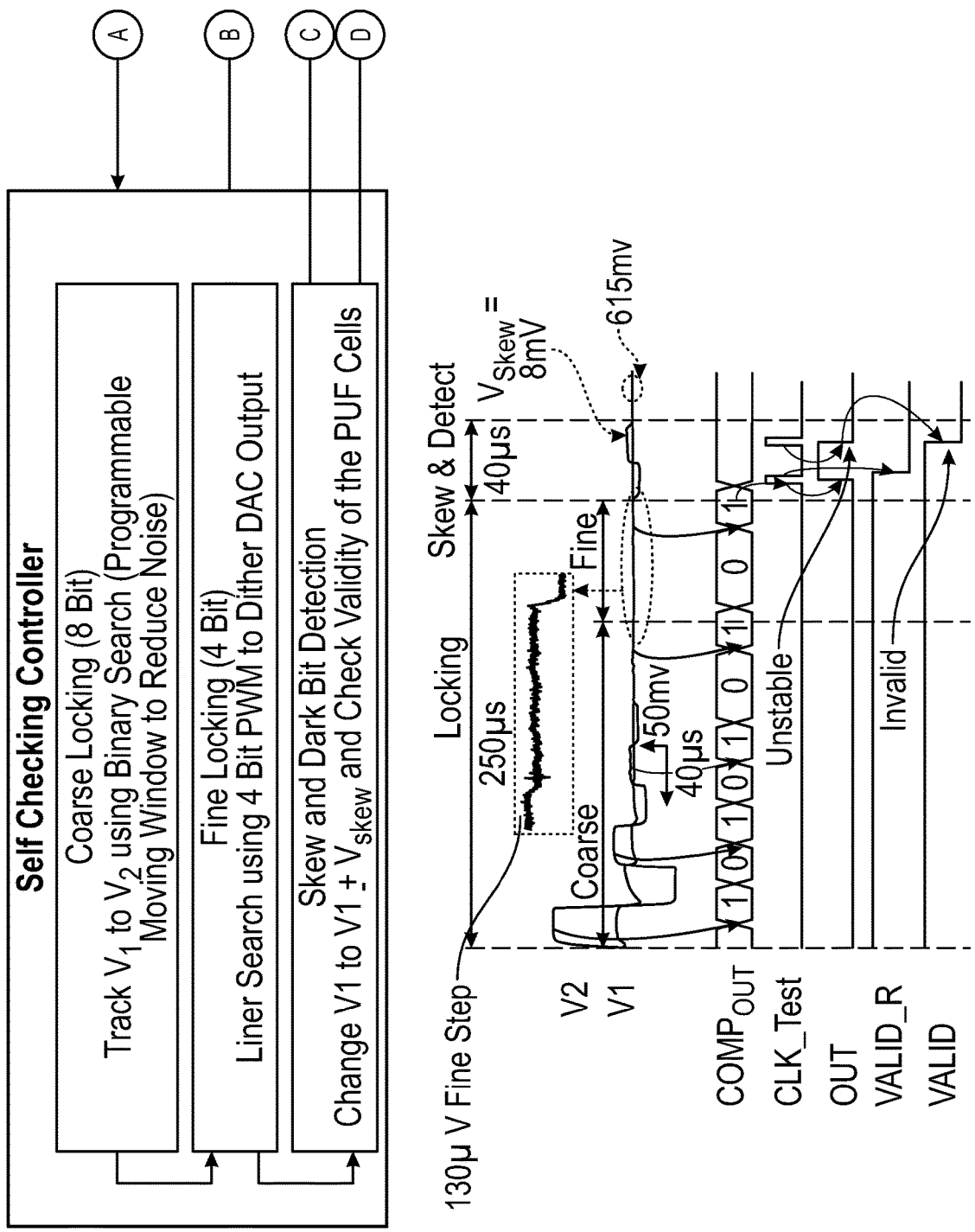
FIG. 4A shows flowchart, circuit diagram, and measured timing waveforms of dark bit detection in ASCH, and a block diagram of a PUF array for 65 nm prototyping (bottom right) in accordance with one or more embodiments.
Figure 4A:
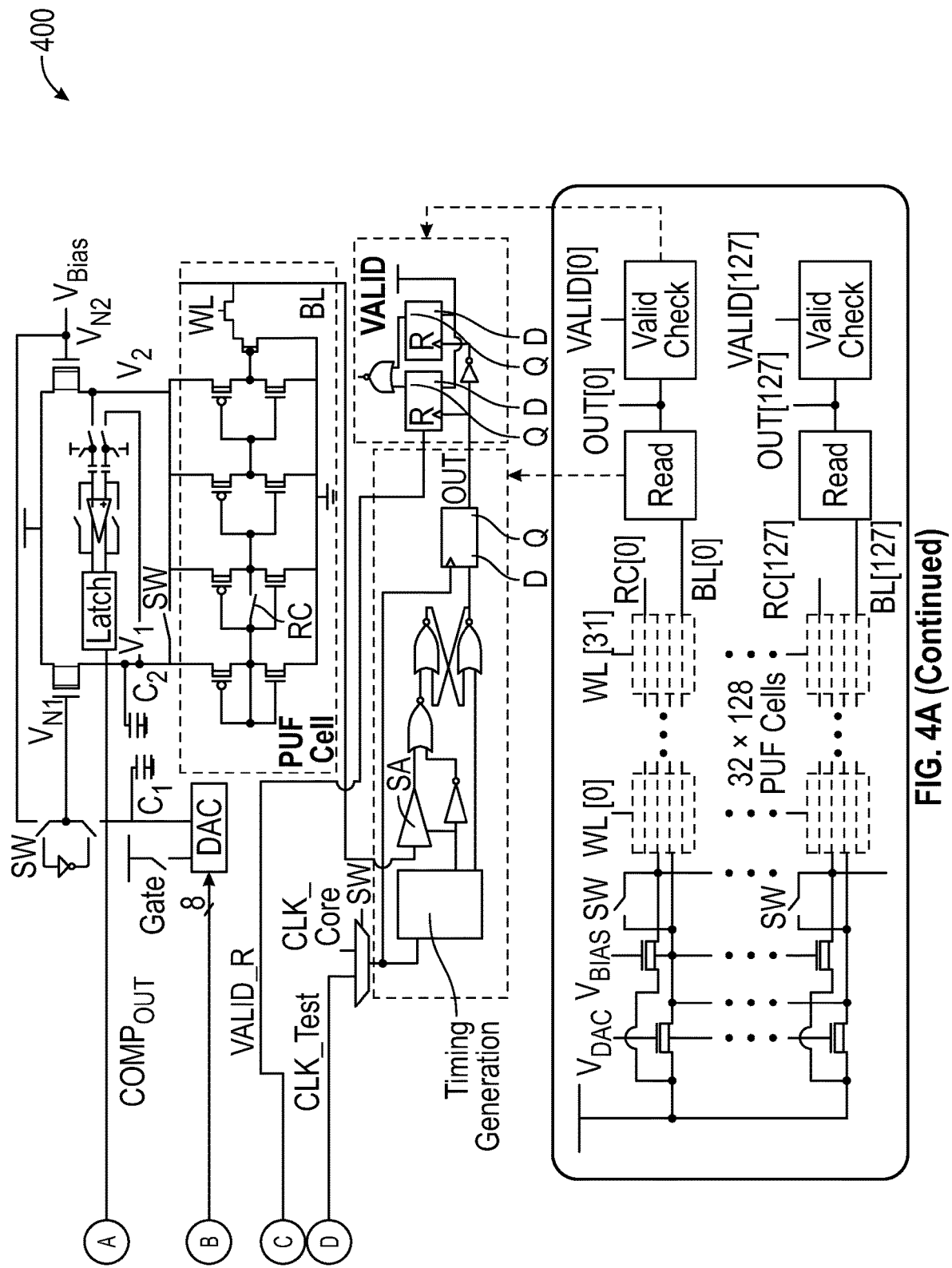

In one or more embodiments, $V_{N2}$ is kept constant and $V_1$ to $V_2$ are locked during each self-checking session, by adjusting $V_{N1}$ with an 8-bit resistive Digital-to-Analog Converter (DAC), as shown in FIG. 4A. To achieve sub-mV accuracy, ASCH employs a two-step locking process with a coarse binary exhaustive search and a fine linear search by dithering the DAC output with 4-bit Pulse Width modulation, effectively achieving a 12-bit resolution. To reduce comparison mismatch and noise, auto-zeroing is implemented, and the comparator outputs are averaged across a configurable moving window.

In some embodiments, the first capacitor $C_1$ and the second capacitor $C_2$ are added to stabilize the dithered voltage. After locking, two consecutive PUF evaluation sessions under programmable ($V_1 \pm V_{skew}$) are performed. All cells that ever flip once during the two sessions are marked as unstable by a validity checker. The dark bit detection accuracy is weakly dependent on the number of PUF evaluations during self-checking, and ten evaluations is decided empirically. A digital ASCH controller automates the whole self-checking process. During normal operation (SW=1), $V_1/V_2$ and $V_{N1}/V_{N2}$ are shorted and disconnected from the ASCH DAC, for PUF evaluations without bias.

Turning to FIG. 4A, FIG. 4A shows illustration 400 which includes a flowchart, circuit diagrams, and measured timing waveforms of dark bit detection in ASCH, and a block diagram of a PUF array for 65 nm prototyping (bottom right) in accordance with one or more embodiments. A 32×128 PUF array with 8T-SRAM-style readout scheme is implemented for prototyping, as shown in FIG. 4A. In some embodiments, a validity check circuit based on two D-FFs is added to every column. Measurement results show that $V_1$ locking and dark bit detection can be done within 250 µs and 40 µs, respectively, and 130 µV resolution is achieved for $V_1$ locking and $V_{skew}$. Since $V_1$ and $V_2$ are shared by all cells in the array and $V_1$ locking result is in digital, self-checking of the entire array can be finished within 2 ms with a single $V_1$ locking process.

A. Dark Bit Detection

Figure 4C:
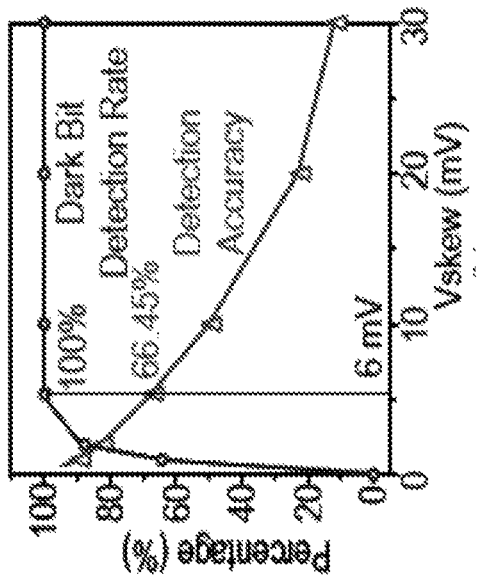
FIGS. 4B and 4C show principle of voltage skew and dark bit detection and simulation of dark bit detection in accordance with one or more embodiments.
Figure 4B:
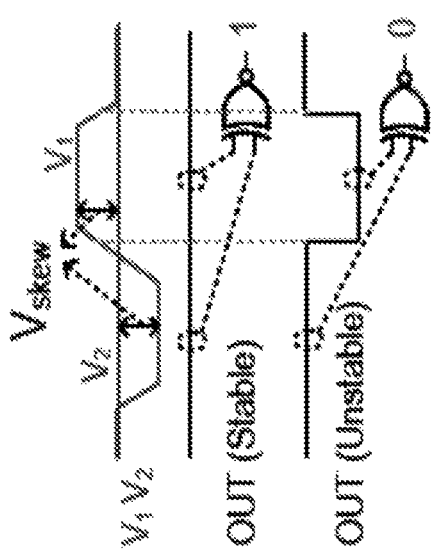

The high-precision dark bit self-checking function is enabled by the PUF system shown in FIG. 4A. In some embodiments, change in each direction is achieved by first decreasing and then increasing the DAC value, which leads to a negative and positive voltage skew, as shown in a schematic 420 in FIG. 4B. The absolute value of the skewing voltage is kept the same in both directions to represent the same amount of mismatch. If the PUF output from two opposite skew flipped, this PUF cell is deemed as a dark bit. SPICE simulation 450 in FIG. 4C shows that the design has 179 unstable bits out of 100000, representing 1.79% instability across −40 to 125 degree. At 6 mV $V_{skew}$, all unstable bits are detected, achieving a 66.45% detection accuracy.

The detection accuracy is defined as:

$$\text{Detection Accuracy} = \frac{\text{\# of Unstable Bits}}{\text{\# of Dark Bits}} \quad (1)$$

Higher detection accuracy means reduced number of falsely rejected bits, which leads to lower masking ratio. The simulation result shows good correlation between the mismatch and actual V/T variation.

As shown in top left illustration in FIG. 4A, a coarse-fine locking process is added before skew and detection to enable self-checking. During coarse locking, the 8 bit DAC searches for the closest $V_1$ value to $V_2$. The DAC value is dithered using 4-bit pulse width modulation. The first capacitor $C_1$ and second capacitor $C_2$ are added to stabilize the dithered voltage. This fine step locking increases the resolution to 12 bits. During locking, sufficient delay is provided to stabilize voltage after each step change. An auto-zeroing comparator is activated 5 times at the end of each step, and a majority of the result is used for accurate comparison between $V_1$ and $V_2$. The digitized $V_1$ value is saved in the controller after locking, and the skew operation is performed with the same 12-bit precision. The amount of skew is provided externally. Two consecutive PUF evaluation sessions under programmable skews are performed. All cells that ever flip once during the two sessions are marked as unstable by the validity detector. The number of PUF evaluations during checking affects the detection of unstable bits caused by noise, which is a smaller but not negligible source of mismatch compared with added skew. 64 evaluations for each session are decided to balance the detection accuracy and checking speed. The illustrated waveform of the self-checking process is shown in lower left of illustration in FIG. 4A.

B. Dark Bit Healing

Figure 5:
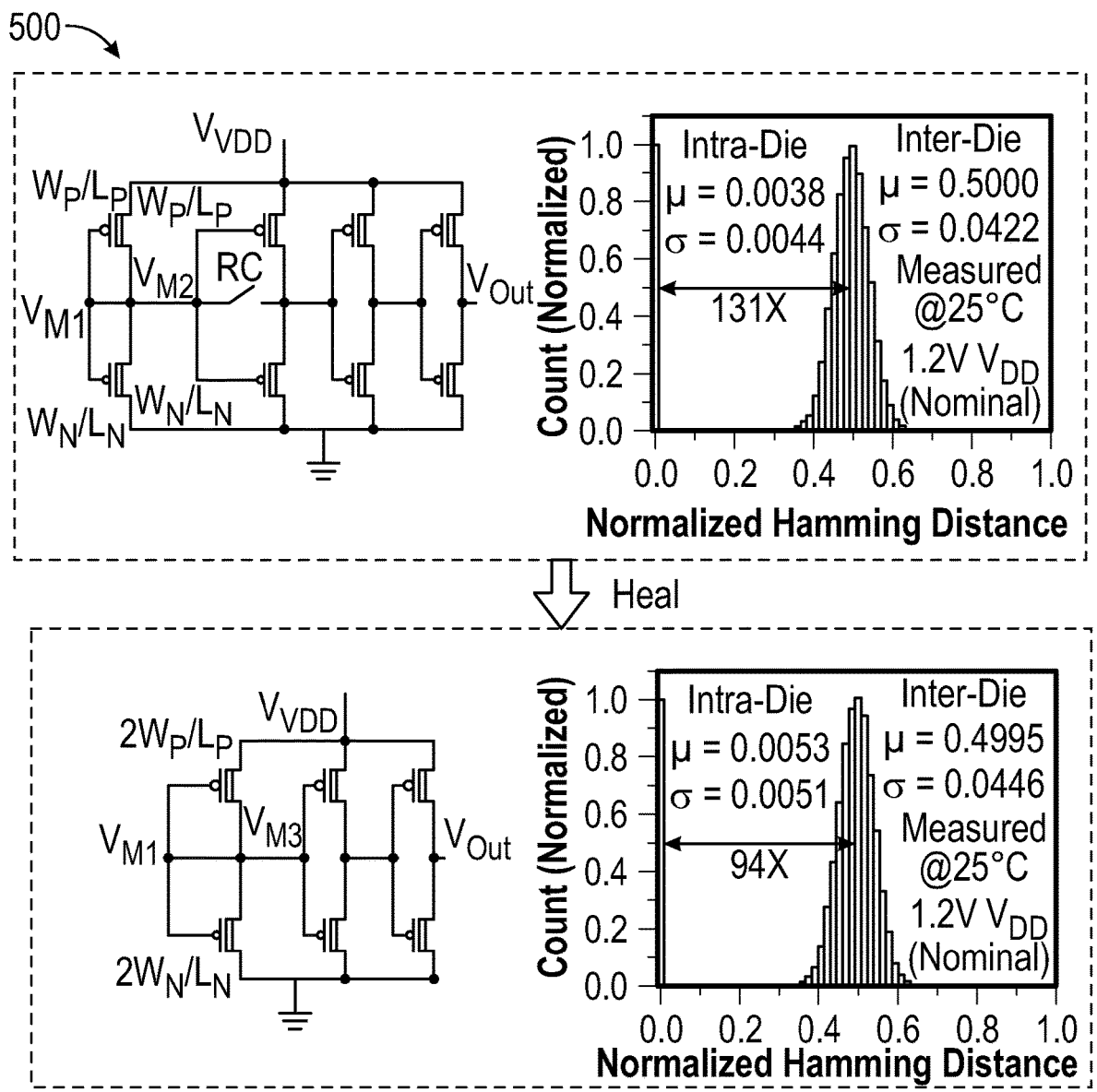
FIG. 5 shows an example in accordance with one or more embodiments.

Instead of directly discarding all the potentially unstable bits, ASCH further leverages the cell reconfiguration design to heal a large portion of unstable bits locally. FIG. 5 shows an example 500 of concept of self-healing PUF cell, along with measured intra- and inter-Hamming distances of original and reconfigured cells across 10 chips in accordance with one or more embodiments.

Figure 6:
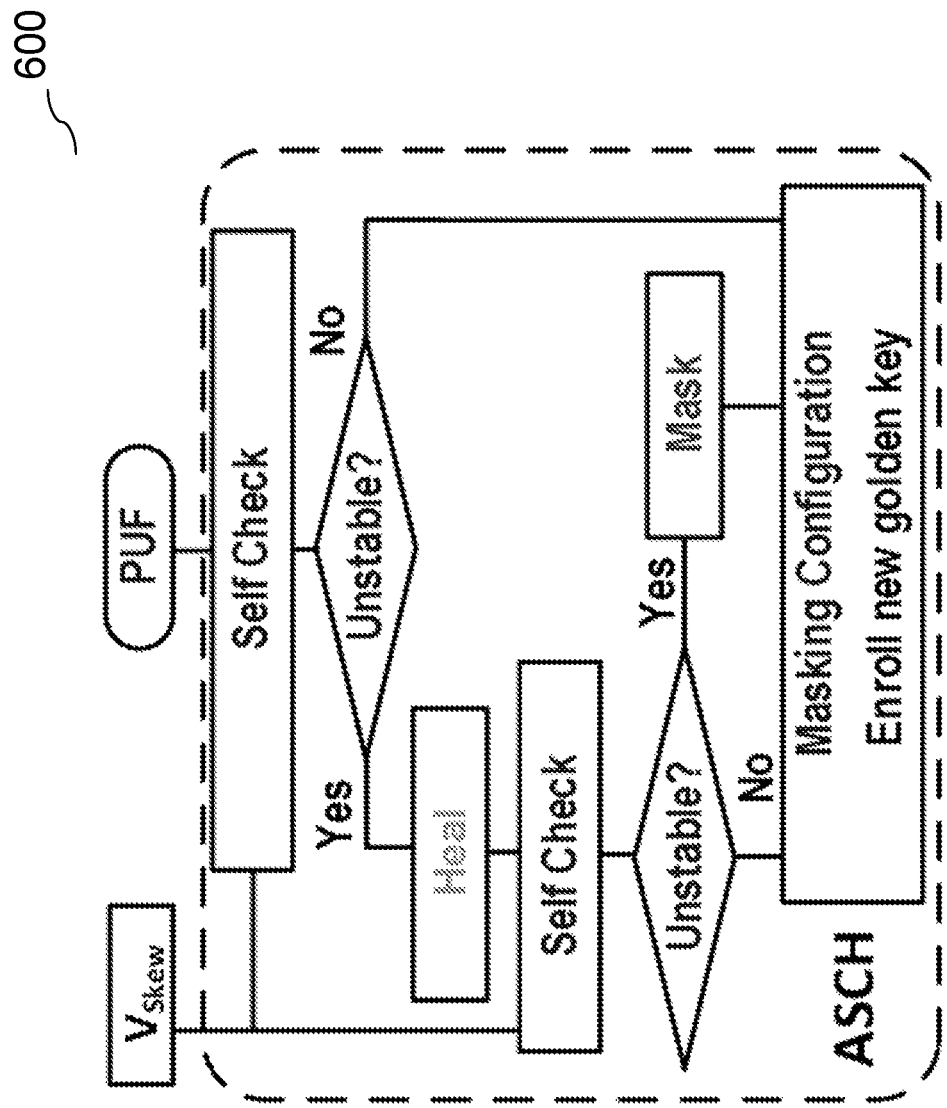
FIG. 6 shows a workflow of ASCH stabilization system in accordance with one or more embodiments.
Figure 17:
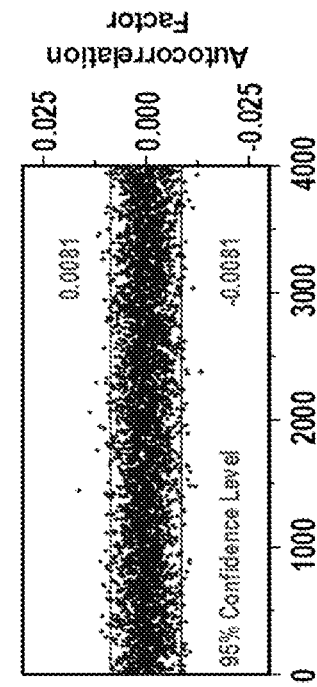
FIG. 17 shows an example in accordance with one or more embodiments.
Figure 17:
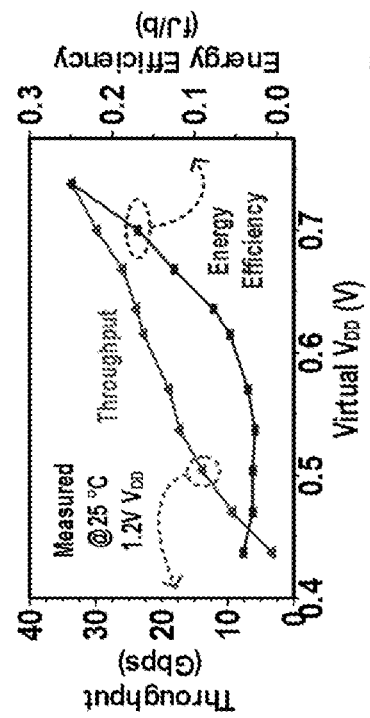

As shown in FIG. 5, shorting stage 1 and 2 converts the original 4-stage cell into an almost independent 3-stage one. The probability that both cells are unstable is very low as shown in FIG. 5. In some embodiments, with a carefully designed layout considering subtle drain/source area symmetries, close-to-ideal uniqueness and identifiability are achieved for both original and heal cells, as evidenced by their respective inter- and intra-Hamming distance measurements. The uniqueness of both original and heal cells from 15 chips are verified with autocorrelation test and all applicable NIST 800-22 and 800-90B randomness sub-tests, as shown in FIG. 17. The overall ASCH workflow 600 is shown in FIG. 6, which performs a second self-checking on healed cells to determine the final cells to discard.

One or more embodiments of the invention focus on three modes of operation for ASCH stabilization system to accommodate different needs of various applications.

Figure 7A:
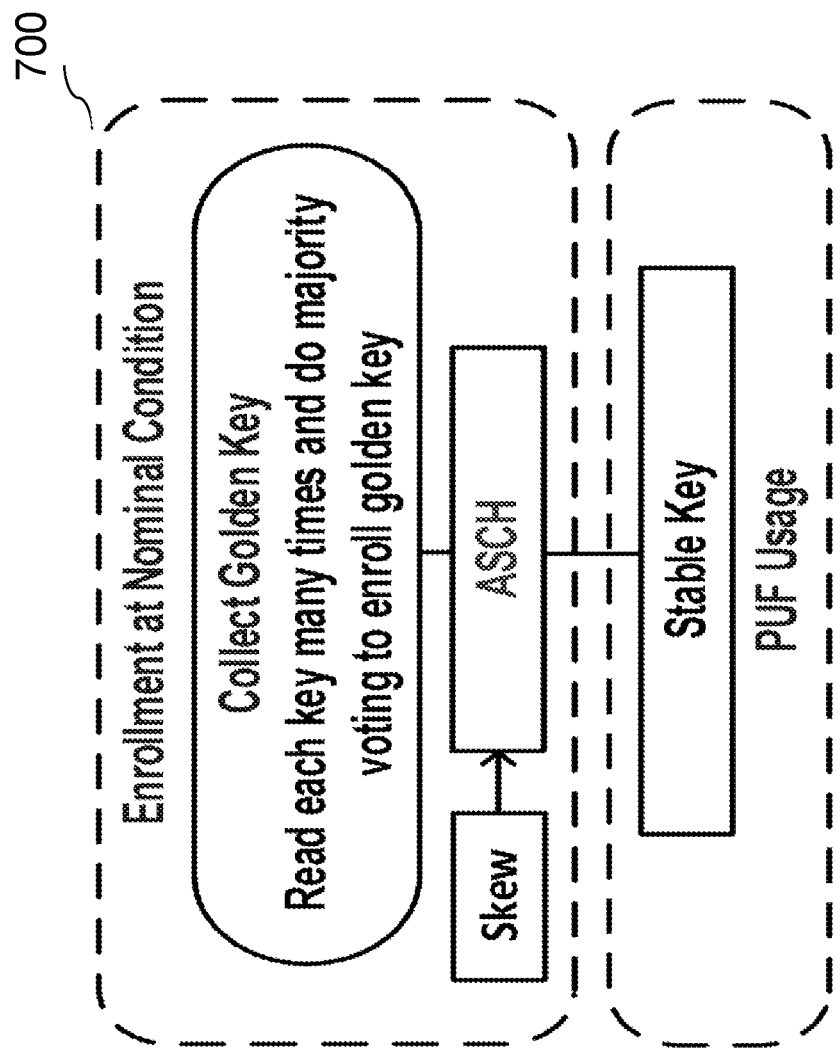
FIGS. 7A and 7B show workflows of ASCH static mode (S-ASCH) operation in accordance with one or more embodiments.
Figure 7B:
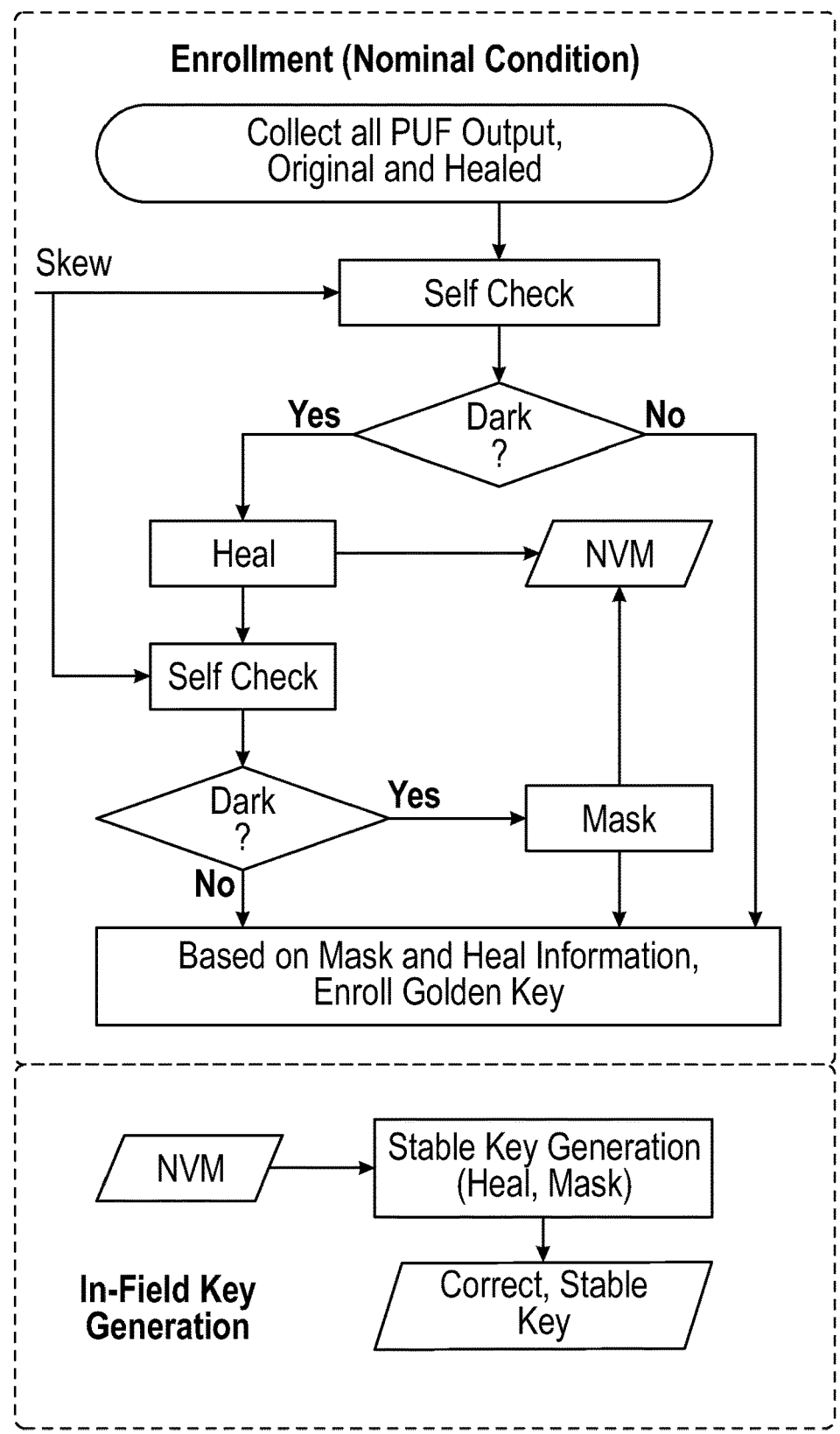

Static Mode: Turning to FIG. 7A, FIG. 7A shows workflow 700 of an ASCH static mode operation (S-ASCH). In static mode, the ASCH is used during enrollment phase as shown in FIG. 7A. In some embodiments, the ASCH generates a mask based on the skew input and remains inactive once the PUF is put to use. FIG. 7B shows the detailed workflow 750 of the (S-ASCH) in accordance to one or more embodiments. At the start of enrollment, all PUF outputs, original and healed, are collected. During ASCH, all PUF cells first go through one round of self-checking. The voltage skew is externally programmed to target a specific BER. After self-checking, the cells that are detected as dark go through healing process, and the healing information is recorded. All the healed cells go through another round of self-checking, and if it is still detected as dark, it is unable to be healed, and therefore masked. The masking information is also stored. Finally, based on the Mask and Heal information gathered from ASCH, the previously gathered PUF outputs are processed into a stable PUF key, and enrolled into server as the golden key. The benefit of healing is explained below.

In some embodiments, PUF array contains three types of PUF cell: the originally stable PUF cells $C_1$, the healed stable PUF cells $C_2$, and the masked unstable cells $C_3$. In order to output the stable golden key during in-field condition, $C_1$ can be directly used, $C_2$ requires its location written into NVM during enrollment so that system can locate $C_2$ and heal it to get the correct and stable key, and $C_3$ not only needs an NVM storage for itself, but it also needs a redundant stable PUF bit $C'_1$, and extra logic to make sure that when the PUF key is generated, $C_3$ output will be replaced with $C'_1$.

Figure 8:
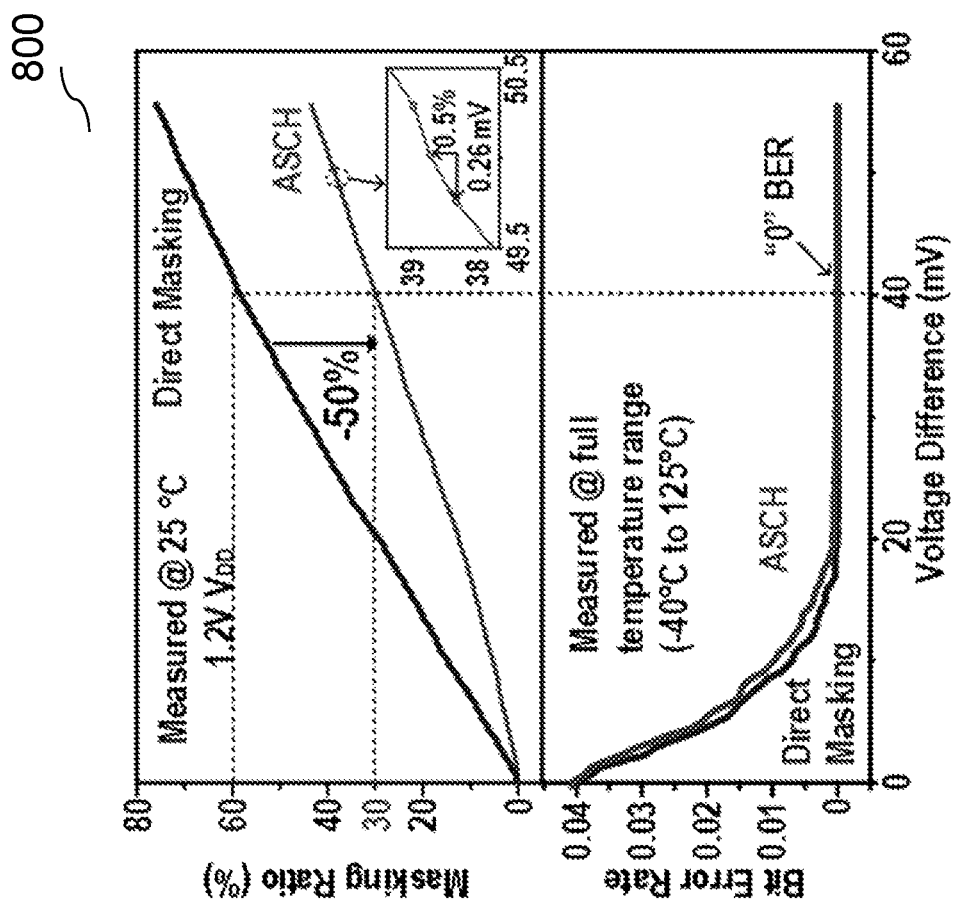
FIG. 8 shows an example in accordance with one or more embodiments.

FIG. 8 shows measured results 800 of masking ratio and BER of S-ASCH and direct masking without self-healing, with regard to applied voltage skew in ASCH. To demonstrate the effectiveness of the self-checking and healing process built in the proposed stabilization system, the BER and masking ratio versus the voltage skew at worst V/T corner of 0.7 V and 125° C. are compared, and the result of direct masking, where all the detected dark bits after the first round of self-checking are masked, versus the result of ASCH is shown. The measurement results in FIG. 8 show that the required masking ratio to achieve "0" BER (in 2000 evaluations of 15 chips across −40 to 125° C.) drops from 60% to 30% when S-ASCH is used instead of direct masking. The 0.13 mV resolution of ASCH DAC leads to ~0.5% masking ratio change per step. When there is no error in all evaluations, it is pessimistically assumed that the BER is 1/(# of evaluations) for plotting. As shown in FIG. 8, the increasing voltage skew represents more aggressive self-checking, leading to the increase of masking ratio and the decrease of BER. Both direct masking and ASCH achieves "0" BER at the same voltage skew, which means the last dark bit found in ASCH is not able to be healed. The final masking ratio for direct masking approach is 56%, which is marginally better than the state-of-the-art design with a similar V/T range [4], without the burden of an additional voltage variation correction step. ASCH further reduces the masking ratio to 31% by healing a portion of the PUF cell, which reduces the PUF redundancy overhead.

Figure 9:
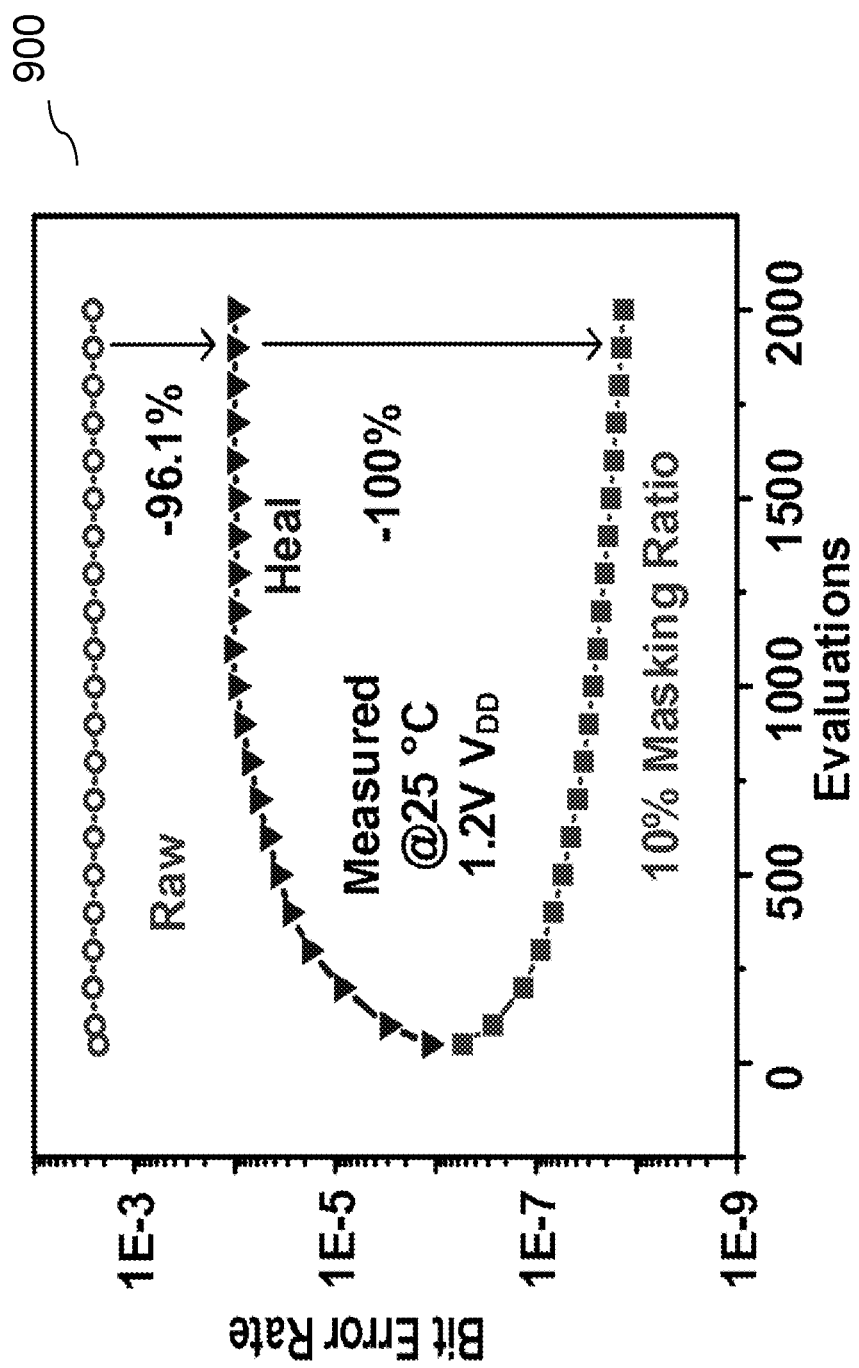
FIG. 9 shows an example in accordance with one or more embodiments.

FIG. 9 shows measured BER 900 of 15 chips before and after stabilizing with healing without self-checking, and S-ASCH at 10% masking ratio. In FIG. 9, the raw BER is 0.29% at (25° C., 1.2V), which is reduced by 96.1% using healing for the unstable cells and reduced to "0" when ASCH is performed with 10% masking ratio. In some embodiments, the PUF design is resistant to voltage variation due to the native regulator, achieving 0.37% worst case BER at 0.7V.

Figure 10:
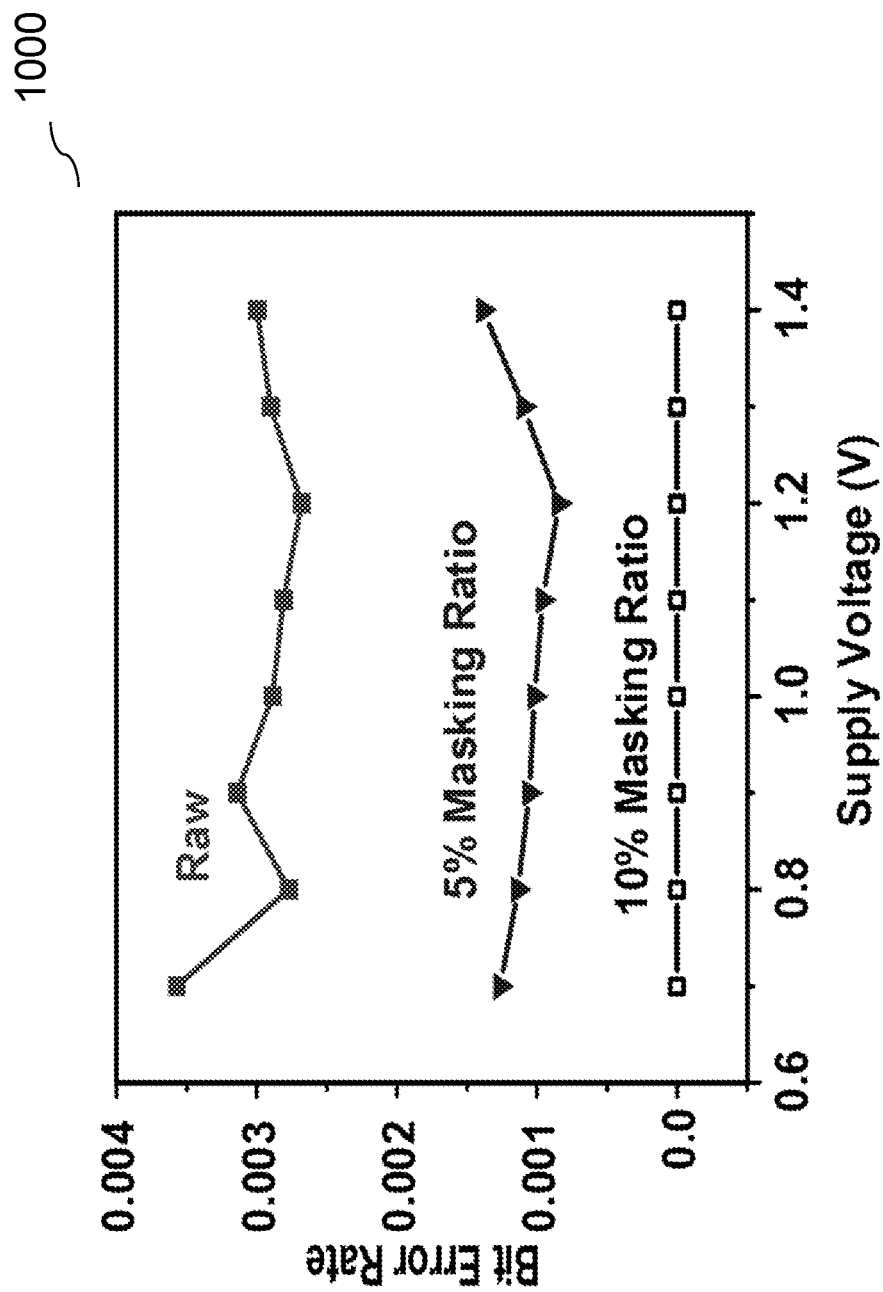
FIG. 10 shows an example in accordance with one or more embodiments.
Figure 11:
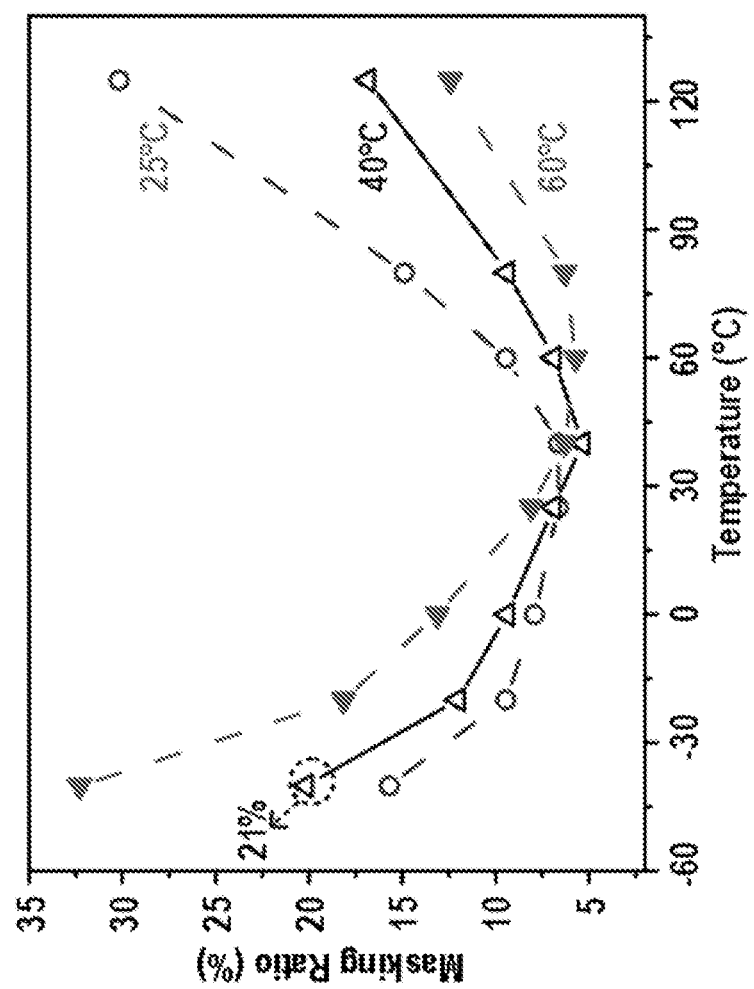
FIG. 11 shows an example in accordance with one or more embodiments.

In some embodiments, the PUF's resistance to supply voltage variation from 0.7 to 1.4 V is evaluated, as shown in measurement 1000 of supply voltage sensitivity of S-ASCH operation in FIG. 10. Thanks to the supply regulation based on native transistors, only 0.4% BER is observed across the voltage range, using ASCH with 10% masking ratio, BER at full supply voltage range can be reduced to "0", as shown in FIG. 10. FIG. 11 shows measurement result 1100 of masking ratio to achieve "0" BER for S-ASCH operation at different enrollment temperature. In FIG. 11, measurement shows that to achieve "0" BER across automotive temperature range, the minimum masking ratio of 21% is achieved when enrolled at 40° C.

Figure 12A:
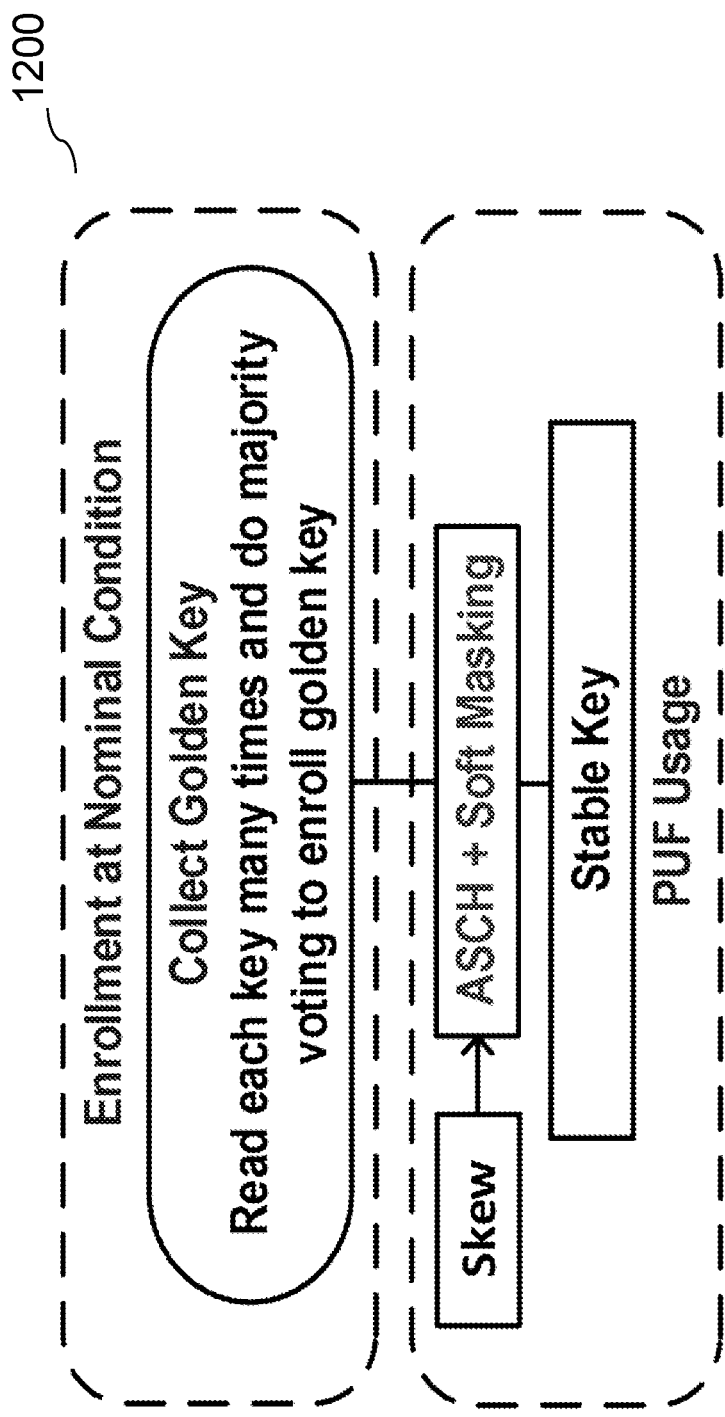
FIGS. 12A and 12B show workflows of ASCH dynamic mode operation (D-ASCH) in accordance with one or more embodiments.
Figure 12B:
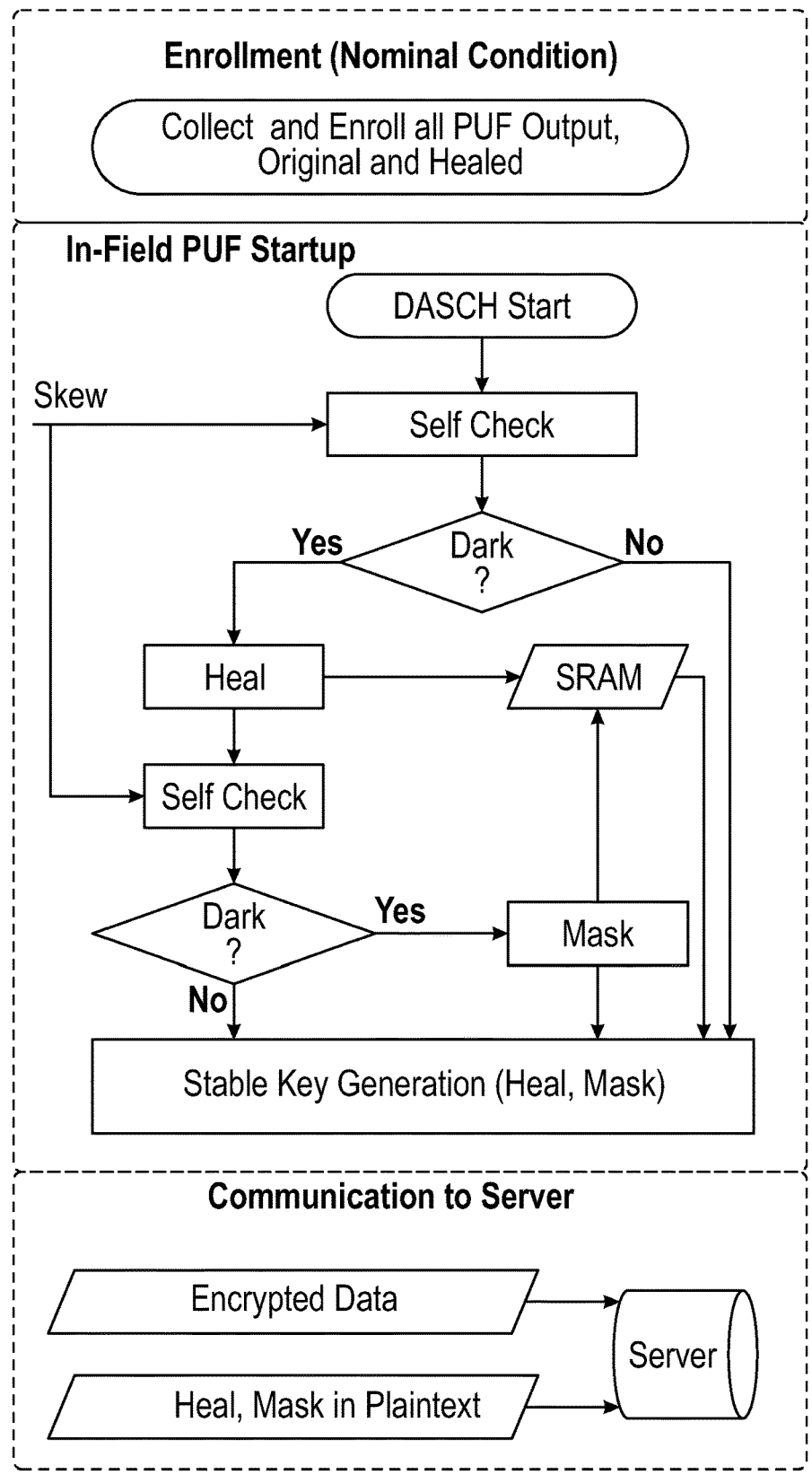

Dynamic Mode: Turning to FIG. 12A, FIG. 12A shows workflow 1200 of an ASCH dynamic mode operation (D-ASCH). In dynamic mode, ASCH is not used during enrollment, but is used every time the PUF array powers up to get an in-field dynamic mask, as shown in FIG. 12A. In some embodiments, instead of storing a static mask to NVM during enrollment, this dynamic mode can utilize techniques similar to soft masking to store its dynamic mask temporarily on registers, saving chip area and preventing certain attacks that exploit the fixed mask. FIG. 12B shows the detailed workflow 1250 of the D-ASCH in accordance to one or more embodiments. As shown in FIG. 12B, during enrollment, the PUF values of both original and reconfigured cells are collected in the server. D-ASCH operates at every chip power-up in the field. The self-checking and healing operation is the same as S-ASCH, and the generated key is used as the correct and stable key for cryptographic purposes. Instead of writing the healing and masking information to NVM, D-ASCH writes the information to a low-cost SRAM look-up table (LUT). In particular, the LUT and a digital stabilization module is added on top of ASCH to perform D-ASCH operations (not shown). SRAM storage is readily available and cheap to integrate in any chip, so the area overhead is negligible. The stabilization module accesses the SRAM for healing and masking information and generates a stable fixed-length key by sequentially reading out the stable PUF cells based on the healing and masking information. When a PUF bit is flagged as stable-after-heal, D-ASCH will heal the PUF cell and read out its value.

Figure 12C:
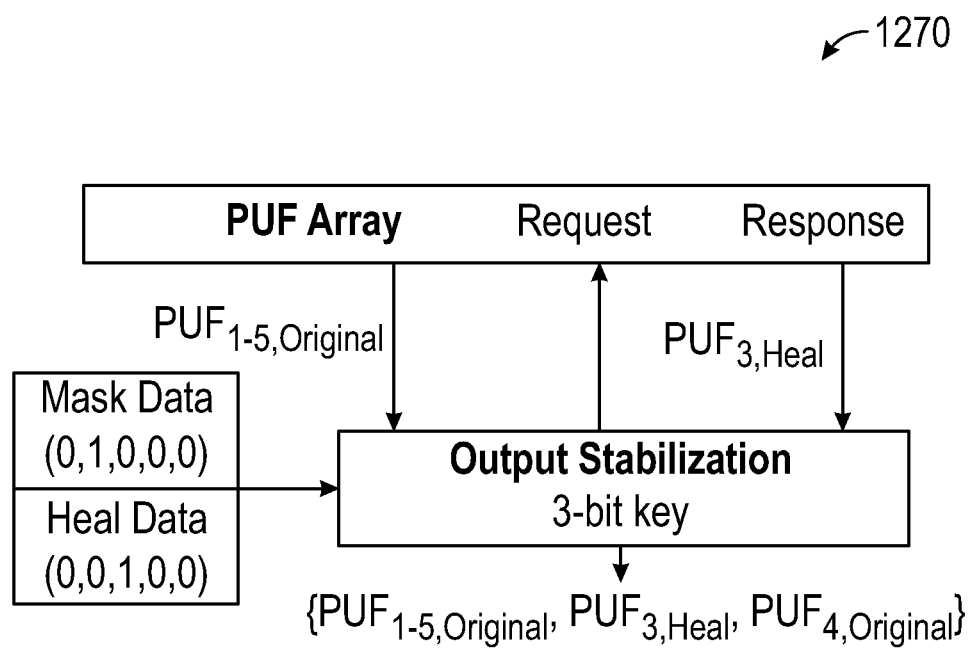
FIG. 12C shows an example of D-ASCH output stabilization in accordance with one or more embodiments.

An example 1270 for a 5-bit input, 3-bit output stabilization is shown in FIG. 12C. For a row of five PUF cells, $PUF_2$ is masked and $PUF_3$ is healed. The stabilization receives the original PUF values, and based on the masking and healing information, omit the $PUF_2$ and requests the $PUF_3$, Heal. So, the final 3-bit key output is: {$PUF_1$, $PUF_3$, Heal, $PUF_4$}. Here, redundant PUF cells are still required, but the overhead of implementing more PUF bits using the proposed compact and ultra-low-power PUF cell is insignificant compared with the savings from removing of NVM-based masking storage.

In some embodiments, the healing and masking information is sent to server prior to using the PUF keys, because a fresh healing and masking map is generated for every chip start-up and is necessary for servers to properly verify the PUF device. This information can be communicated in plaintext with no concern of eavesdropping because it is random and independent of the actual PUF values.

Similar to S-ASCH, D-ASCH significantly reduces the ECC cost for stable key generation. It further eliminates the requirement of NVM for masking storage, which significantly reduces the area overhead for a complete PUF design. The downside is the increased storage in the server because D-ASCH now needs to store the whole original and healed PUF array instead of a key that is shorter in length.

Figure 13:
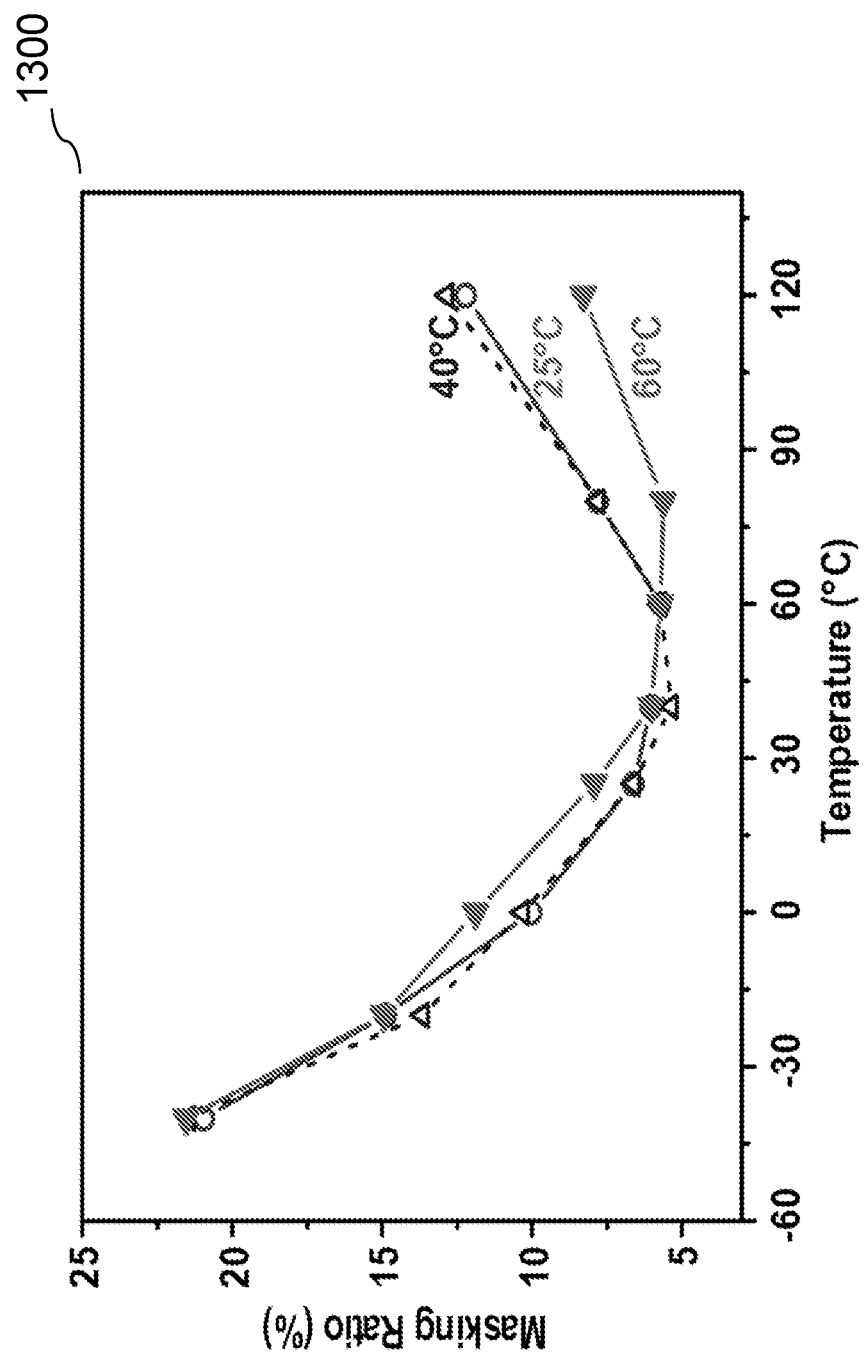
FIG. 13 shows an example in accordance with one or more embodiments.

FIG. 13 shows measurement result 1300 of masking ratio to achieve "0" BER for D-ASCH operation at different enrollment temperature. In FIG. 13, measurement shows that dynamic mode achieves similar minimum masking ratio (22%) to achieve "0" BER across the temperature range compared with static mode. In addition, an enrollment temperature only slightly affects the result as shown in FIG. 13.

Figure 14:
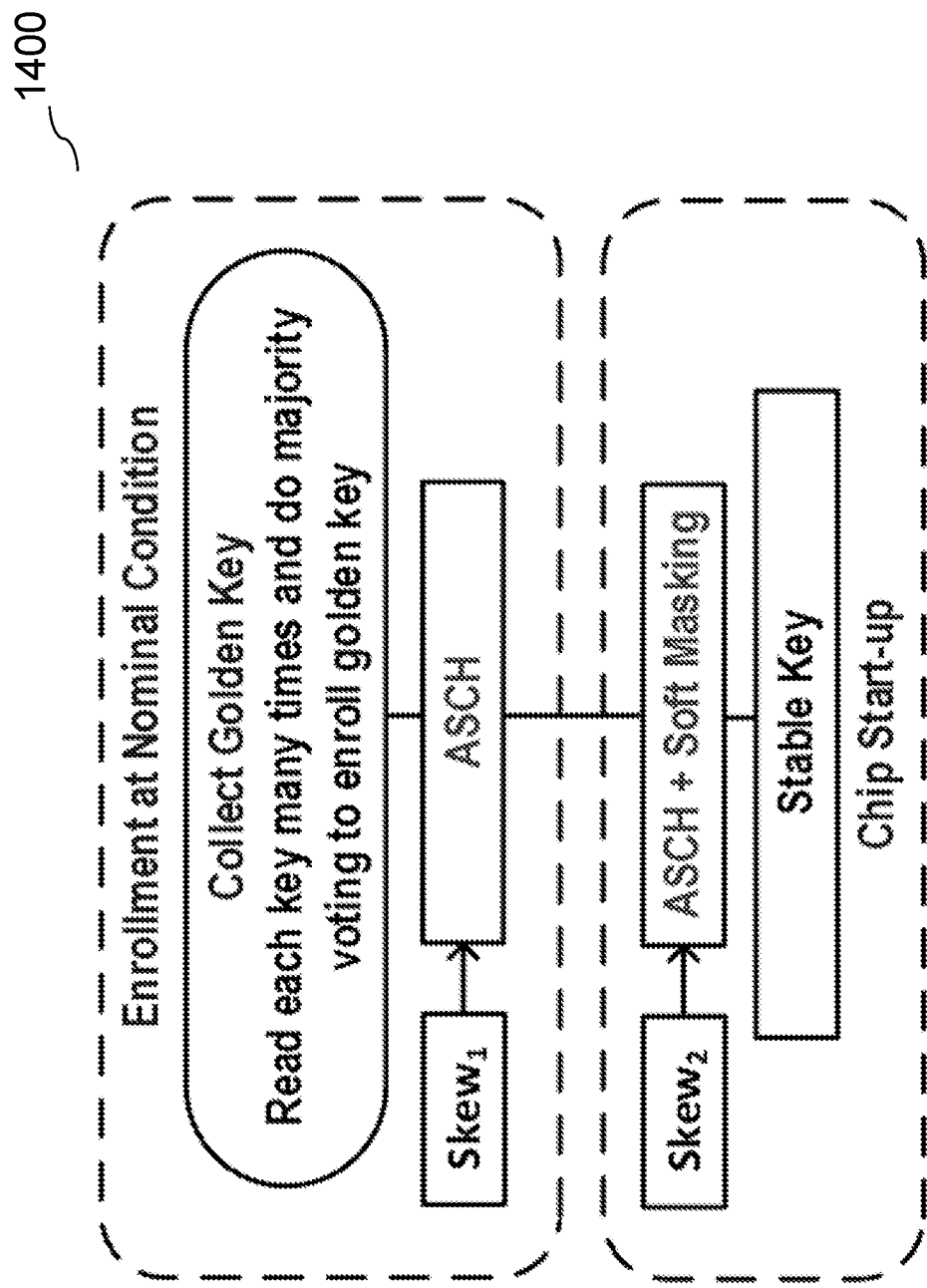
FIG. 14 shows a workflow of ASCH hybrid mode operation (H-ASCH) in accordance with one or more embodiments.
Figure 15:
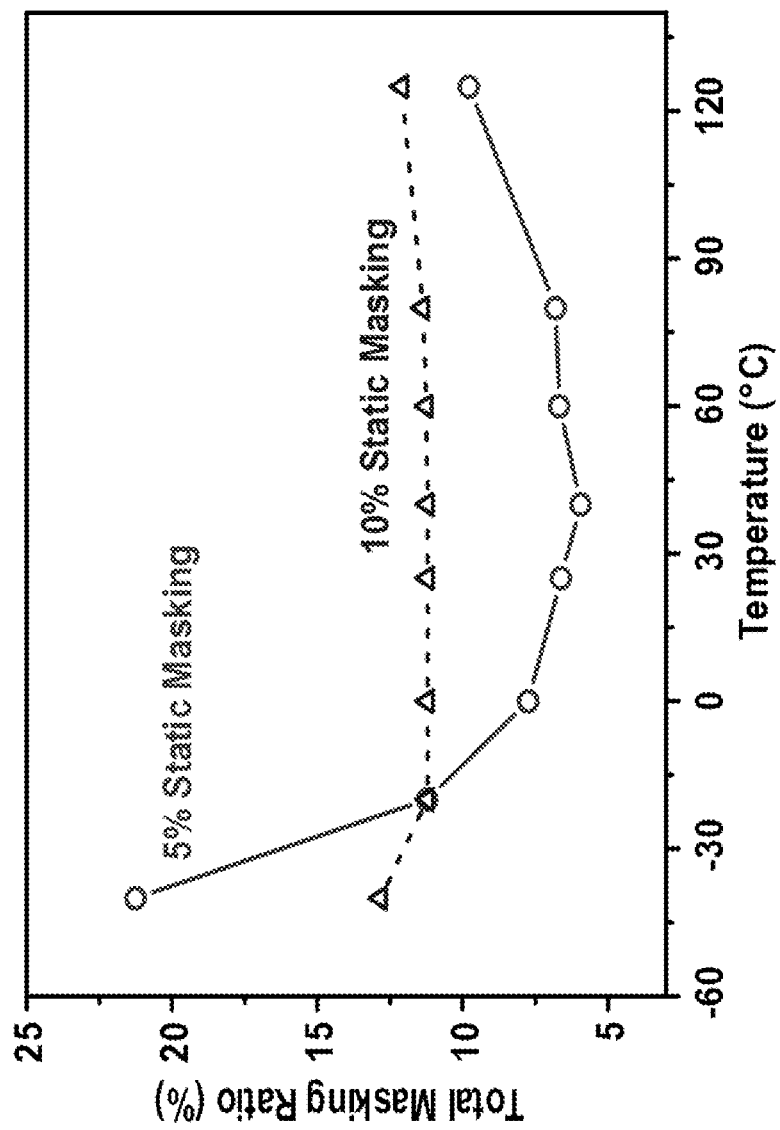
FIG. 15 shows an example in accordance with one or more embodiments.

Hybrid Mode: Turning to FIG. 14, FIG. 14 shows workflow 1400 of an ASCH hybrid mode operation (H-ASCH). In hybrid mode, ASCH is used both during enrollment and during chip start-up, combining static mask and dynamic mask to achieve the minimum masking ratio for "0" BER across the entire temperature range by carefully selecting two skew parameters, as shown in FIG. 14. FIG. 15 shows measurement result 1500 of total masking ratio to achieve "0" BER for H-ASCH operation at 40° C. enrollment temperature. In FIG. 15, measurement shows that at 5% static masking ratio, the overall masking ratio is still comparable with either static or dynamic masking, but the ratio drops to 13% when static masking ratio is increased to 10%.

Figure 16:
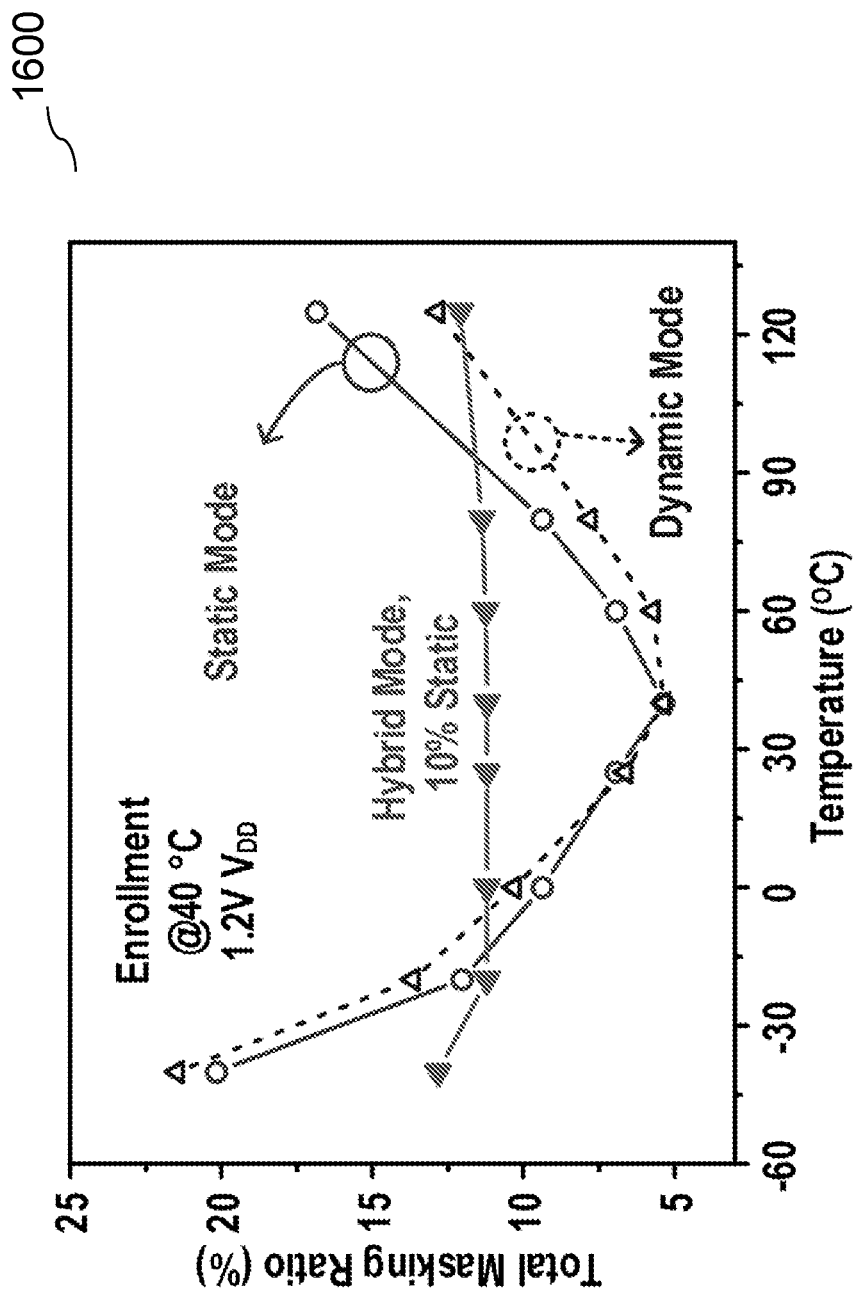
FIG. 16 shows comparison among three ASCH modes in accordance with one or more embodiments.

In one or more embodiments, to compare the three different mode of operation, the plots of the best result for all three modes 1600 are combined, as shown in FIG. 16. At enrollment temperature of 40° C., static mode and dynamic mode show similar results in terms of masking ratio required for "0" BER, while hybrid mode with 10% static mode shows steadier and about 2 times smaller masking ratio across automobile temperature range.

In some embodiments, the PUF is further validated by passing all NIST 800-22 and 800-90B randomness tests. FIG. 17 shows NIST Pub 800-22 randomness test and autocorrelation results 1700 on a collection of original and healed cells from 15 chips (in total 15×4096×2=122,880 bits); NIST Pub 800-90B test results; measured accelerated aging results of ASCH PUF; throughput and energy efficiency at different regulated supply voltage for PUF cells. At 0.4V bias voltage, the PUF runs at 22.752 Gb/s with 0.057 fJ/b core energy efficiency, as shown in FIG. 17. The autocorrelation of 40960 PUF bits with 95% white noise confidence level at 0.0081 is shown in lower right plot in FIG. 17. To further evaluate the randomness of PUF responses, NIST 800-90B and 800-22 randomness test suites are performed on 40 960 bits collected from 10 chips. With the limited number of bits, 10 out of 15 subtests in 800-22 are available. NIST recommended settings were used to run the tests. The PUF bits passed all available subtests in the two suites, showing high-quality randomness as shown in Tables I and II of FIG. 17.

In some embodiments, at PUF cell VDD at 615 mV, the design reaches 22.75 Gb/s readout throughput. This is enabled by the SRAM-style array and the 128-bit parallel readout peripheral. The subthreshold operation consumes 0.056 f J per bit core energy. The through-put and energy efficiency curves versus regulated PUF VDD are shown in lower left plot in FIG. 17. The throughput and energy efficiency were measured under nominal conditions. Since the PUF circuits work in the subthreshold region, the transistor current in-creases exponentially with temperature. Native transistor based regulation suppresses the supply voltage-induced influence on current.

Figure 18:
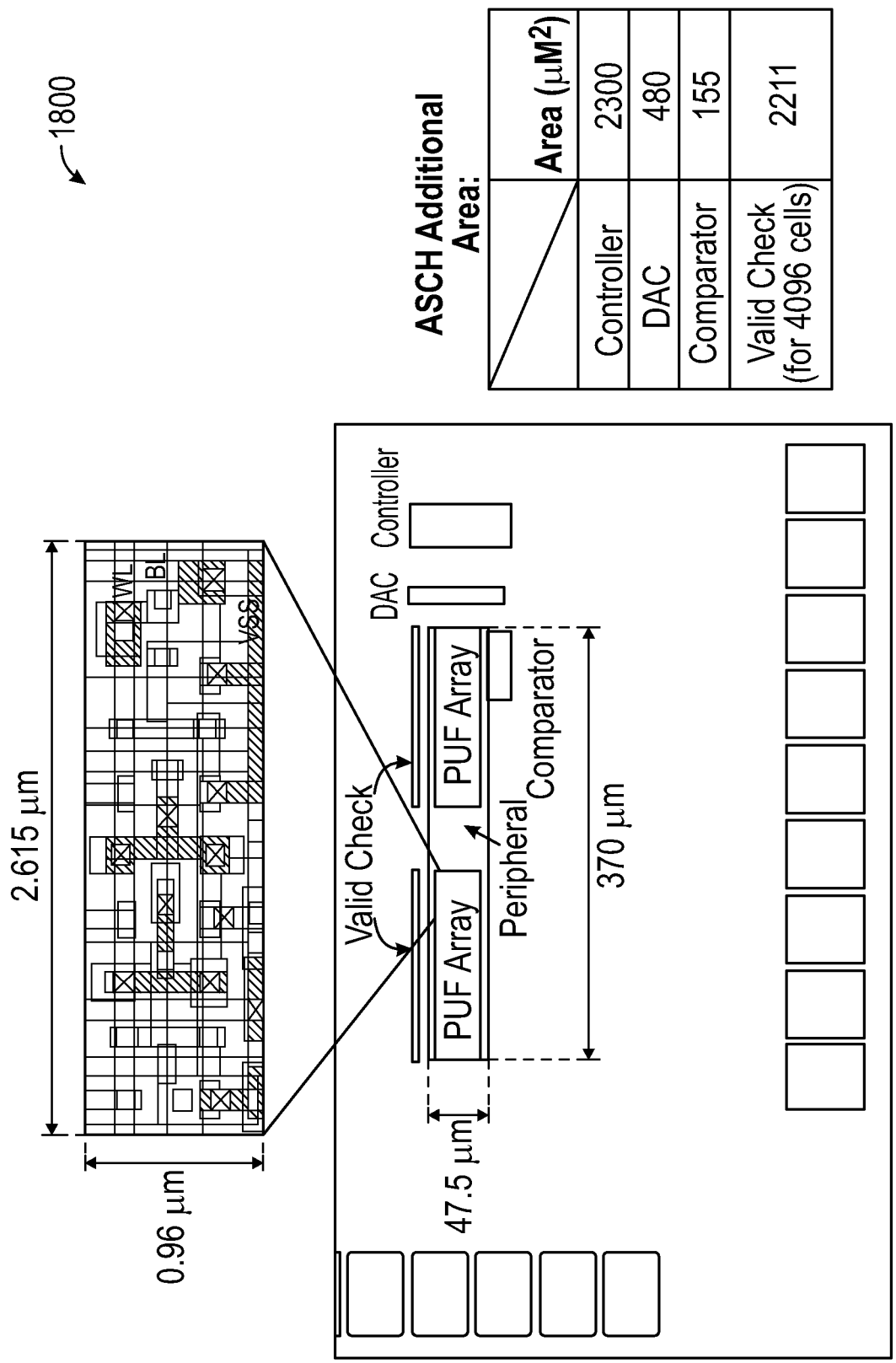
FIG. 18 shows an example in accordance with one or more embodiments.

The chip is fabricated using a 65-nm CMOS process. The 128×32 cell array occupies 0.018 mm$^2$. The die micrograph 1800, the layout of the PUF cell and the area overhead of the components needed for ASCH are shown in FIG. 18 in accordance with one or more embodiments. Each PUF cell measures 0.96 μm×2.615 μm, or 594 F$^2$. Aside from Validity Detector that is implemented one per column, the size of all other additional components does not increase with larger PUF array implementation. A voltage controlled oscillator (VCO) is integrated to provide high-speed clocking for stabilization control and key access.

The nominal condition for the PUF chip is 25° C. and 1.2V supply voltage. Golden keys are collected under nominal conditions by averaging our random noise with many samples. The BER and unstable bit percentage results are measured by comparing separately collected samples under nominal and V/T variations with the golden key.

Figure 19:
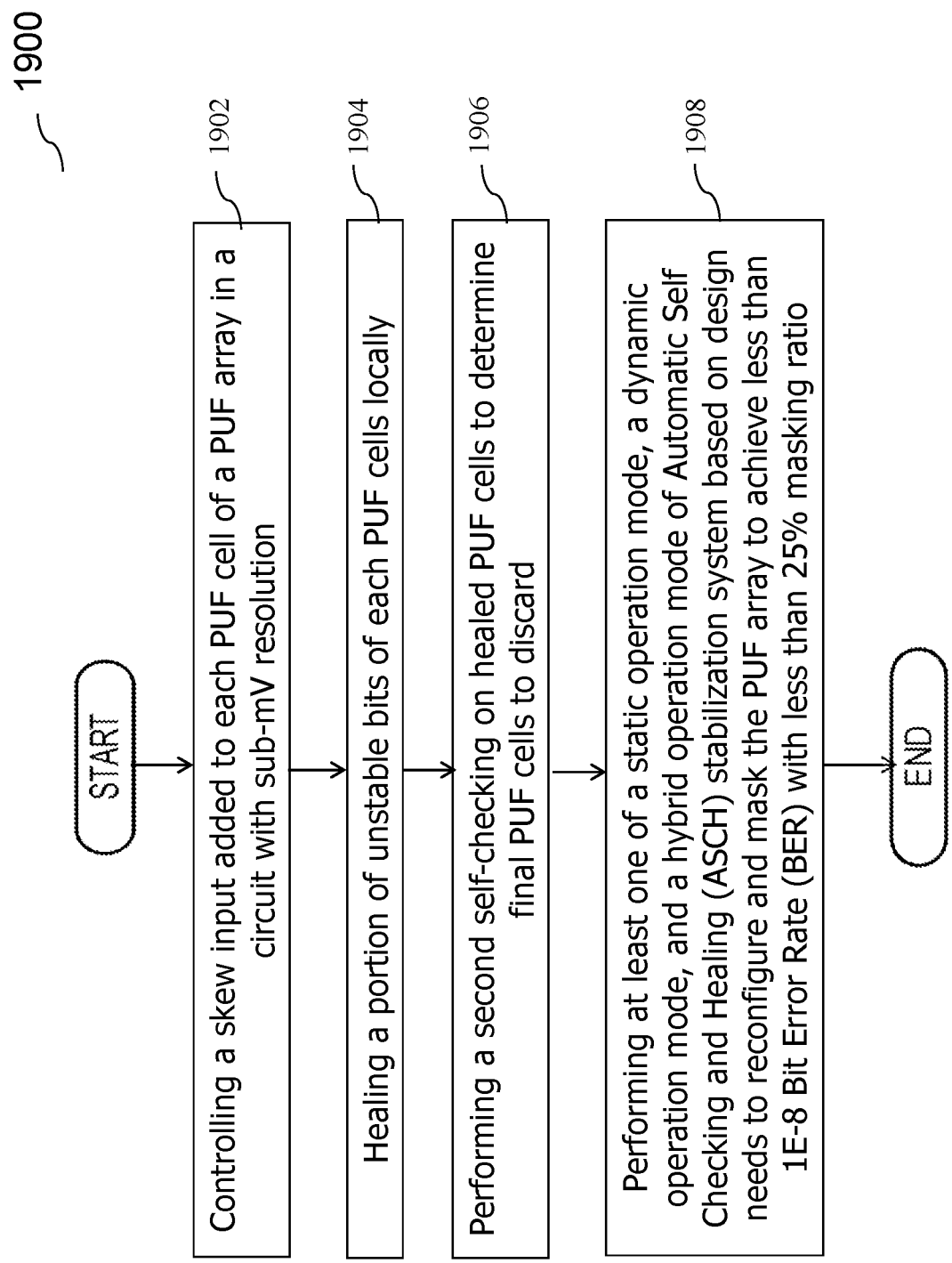
FIG. 19 shows a flowchart in accordance with one or more embodiments.

Turning to FIG. 19, FIG. 19 shows a flowchart 1900 describing methods for an automatic self-checking and healing of PUFs, in accordance with one or more embodiments. While the various steps in FIG. 19 are presented and described sequentially, one of ordinary skill in the art will appreciate that some or all of the steps may be executed in different orders, may be combined, or omitted, and some or all of the steps may be executed in parallel. Furthermore, the steps may be performed actively or passively. The method may be repeated or expanded to support multiple components and/or multiple users within a field environment. Accordingly, the scope of the invention should not be considered limited to the specific arrangement of steps shown in the flowchart.

In Step 1902, a skew input added is accurately controlled in ASCH stabilization system to each PUF cell (e.g., PUF cell 100) of a PUF array (e.g., PUF array 200) in a circuit with sub-mV resolution. In particular, $V_{N2}$ is kept constant and $V_1$ to $V_2$ are locked during each self-checking session, by adjusting $V_{N1}$ with an 8-bit resistive DAC, as shown in FIG. 4. To achieve sub-mV accuracy, ASCH employs a two-step locking process with a coarse binary exhaustive search and a fine linear search by dithering the DAC output with 4-bit PWM, effectively achieving a 12-bit resolution. To reduce comparison mismatch and noise, auto-zeroing is implemented, and the comparator outputs are averaged across a configurable moving window. Capacitors $C_1$ and $C_2$ are added to stabilize the dithered voltage.

In Step 1904, a portion of unstable bits of each PUF cells is healed locally. After locking, two consecutive PUF evaluation sessions under programmable ($V_1 \pm V_{skew}$) are performed. All cells that ever flip once during the two sessions are marked as unstable by a validity checker.

In some embodiments, a digital ASCH controller automates the whole self-checking process. A validity check circuit based on two D-FFs is added to every column. Instead of directly discarding all the potentially unstable bits, ASCH further leverages the cell reconfiguration design to heal a large portion of unstable bits locally. With a carefully designed layout considering subtle drain/source area symmetries, close-to-ideal uniqueness and identifiability are achieved for both original and heal cells. In Step 1906, ASCH stabilization system performs a second self-checking on healed cells to determine the final PUF cells to discard.

In Step 1908, at least one of a static operation mode, a dynamic operation mode, and a hybrid operation mode of ASCH system based on design needs to reconfigure and mask the PUF array to achieve less than 1E-8 Bit Error Rate (BER) with less than 25% masking ratio. In some embodiments, at enrollment temperature of 40° C., static mode and dynamic mode shows similar result in terms of masking ratio required for "0" BER, while hybrid mode with 10% static mode shows steadier and about 2 times smaller masking ratio across automobile temperature range.

Figure 20A:
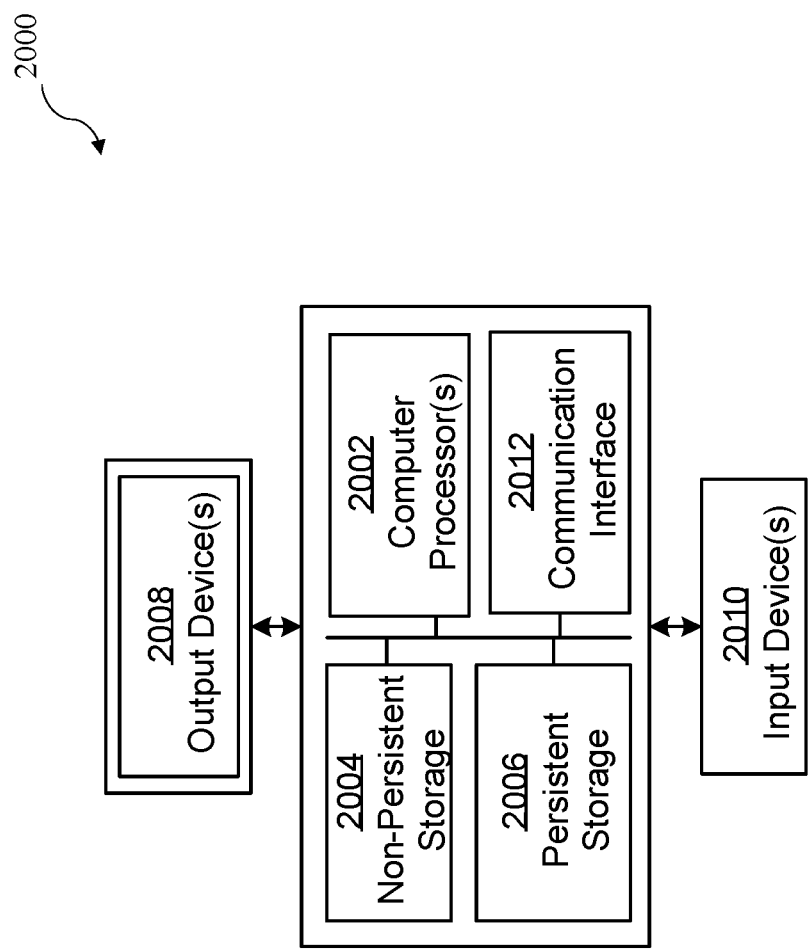
FIGS. 20A and 20B show a computing system in accordance with one or more embodiments.

The subject matter described in one or more embodiments above may be implemented in a computing system. FIG. 20 shows a computing system in accordance with one or more embodiments of the invention. Any combination of mobile, desktop, server, router, switch, embedded device, or other types of hardware may be used. For example, as shown in FIG. 20A, the computing system (2000) may include one or more computer processors (2002), non-persistent storage (2004) (for example, volatile memory, such as random access memory (RAM), cache memory), persistent storage (2006) (for example, a hard disk, an optical drive such as a compact disk (CD) drive or digital versatile disk (DVD) drive, a flash memory), a communication interface (2012) (for example, Bluetooth interface, infrared interface, network interface, optical interface), and numerous other elements and functionalities.

The computer processor(s) (2002) may be an integrated circuit for processing instructions. For example, the computer processor(s) may be one or more cores or micro-cores of a processor. The computing system (2000) may also include one or more input devices (2010), such as a touchscreen, keyboard, mouse, microphone, touchpad, or electronic pen.

The communication interface (2012) may include an integrated circuit for connecting the computing system (2000) to a network (not shown) (for example, a local area network (LAN), a wide area network (WAN), such as the Internet, mobile network, or any other type of network) or to another device, such as another computing device.

Further, the computing system (2000) may include one or more output devices (2008), such as a screen (for example, a liquid crystal display (LCD), a plasma display, touchscreen, cathode ray tube (CRT) monitor, or projector), a printer, external storage, or any other output device. One or more of the output devices may be the same or different from the input device(s). The input and output device(s) may be locally or remotely connected to the computer processor(s) (2002), non-persistent storage (2004), and persistent storage (2006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s) is configured to perform one or more embodiments of the disclosure.

Figure 20B:
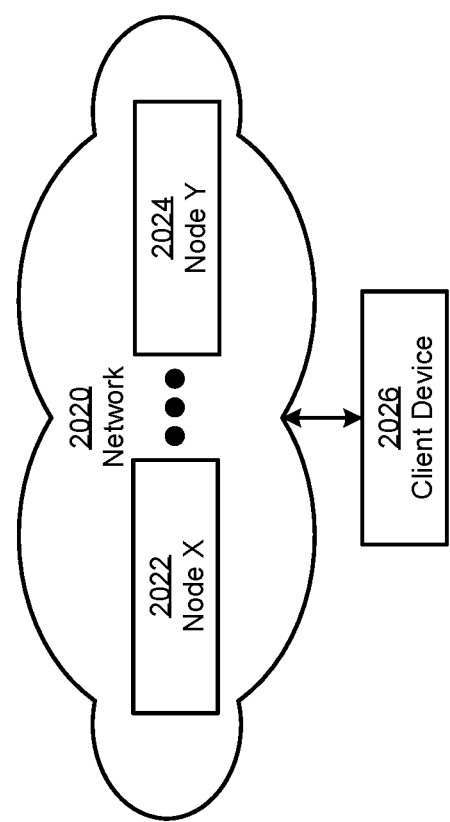

The computing system (2000) in FIG. 20A may be connected to or be a part of a network. For example, as shown in FIG. 20B, the network (2020) may include multiple nodes (for example, node X (2022), node Y (2024)). Each node may correspond to a computing system, such as the computing system shown in FIG. 20A, or a group of nodes combined may correspond to the computing system shown in FIG. 20A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (2000) may be located at a remote location and connected to the other elements over a network.

Although not shown in FIG. 20B, the node may correspond to a blade in a server chassis that is connected to other nodes via a backplane. By way of another example, the node may correspond to a server in a data center. By way of another example, the node may correspond to a computer processor or micro-core of a computer processor with shared memory or resources.

The nodes (for example, node X (2022), node Y (2024)) in the network (2020) may be configured to provide services for a client device (2026). For example, the nodes may be part of a cloud computing system. The nodes may include functionality to receive requests from the client device (2026) and transmit responses to the client device (2026). The client device (2026) may be a computing system, such as the computing system shown in FIG. 20A. Further, the client device (2026) may include or perform all or a portion of one or more embodiments of the disclosure.

The computing system or group of computing systems described in FIGS. 20A and 20B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the selection by the user.

The computing system of FIG. 20A may include functionality to present raw or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, for example, data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, for example, by obtaining data from a data attribute within the data object that identifies the data object type. Then, the GUI may determine any rules designated for displaying that data object type, for example, rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The previous description of functions presents only a few examples of functions performed by the computing system of FIG. 20A and the nodes or client device in FIG. 20B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed as new and desired to be protected by Letters Patent of the United States is:

1. A method for an Automatic Self Checking and Healing (ASCH) of Physically Unclonable Functions (PUFs), the method comprising:
   controlling a skew input added to each PUF cell of a PUF array in a circuit with sub-mV resolution;
   healing a portion of unstable bits of each PUF cells locally;
   performing a second self-checking on healed PUF cells to determine final PUF cells to discard; and
   performing at least one of a static operation mode, a dynamic operation mode, and a hybrid operation mode of ASCH stabilization system based on design needs to reconfigure and mask the PUF array to achieve less than 1E-8 Bit Error Rate (BER) with less than 25% masking ratio,
   wherein the circuit comprises the skew input, a self checking controller, a high-speed readout circuit, a validity detector, and a Digital-to-Analog Converter (DAC), and
   wherein each PUF cell in the PUF array is an inverter-based PUF and includes a first stage inverter and a second stage inverter such that the second stage inverter comprising other stages except the first stage inverter.

2. The method as set forth in claim 1, wherein in the static operation mode, ASCH is used during enrollment phase and generates a static mask based on the skew input, and remains active once the PUF array is put to use.

3. The method as set forth in claim 1, wherein in the dynamic operation mode, ASCH is not used during enrollment, but is used every time the PUF array start-up to get an in-field dynamic mask and the dynamic mask is stored temporarily on registers.

4. The method as set forth in claim 1, wherein in the hybrid operation mode, ASCH is used both during enrollment and during the PUF array start-up, combining the static mask and the dynamic mask to achieve the minimum masking ratio for "0" BER across an entire temperature range by carefully selecting two skew parameters.

5. The method as set forth in claim 1, wherein to achieve sub-mV accuracy, the ASCH stabilization system employs a two-step locking process with a coarse binary exhaustive search and a fine linear search by dithering a DAC output with a 4-bit Pulse Width Modulation (PWM) to achieve a 12-bit resolution, and
   wherein after locking, two consecutive PUF evaluation sessions are performed and all PUF cells that ever flip once during the two sessions are marked as unstable by a validity checker.

6. The method as set forth in claim 1, further comprising:
   implementing auto-zeroing and averaging comparator outputs across a configurable moving window to reduce comparison mismatch and noise.

7. The method as set forth in claim 1, wherein a first capacitor and a second capacitor are added to the circuit to stabilize a dithered voltage.

8. The method as set forth in claim 1, wherein a dark bit detection accuracy is dependent on the number of PUF evaluation sessions during self-checking.

9. A circuit for an Automatic Self Checking and Healing (ASCH) of Physically Unclonable Functions (PUFs), the circuit comprising:
   a PUF cell;
   a self-checking controller;
   a validity detector for automatic detection of unstable cells by checking stability of the PUF cell based on an evaluated PUF bit;
   an 8-bit resistive Digital-to-Analog Converter (DAC);
   an auto-zeroing comparator;
   a skew input;
   a timing control;
   a power rail;
   a ground rail;
   a plurality of pMOSFET (Metal Oxide Semiconductor Field Effect Transistor); and
   a plurality of nMOSFET,
   wherein the PUF cell further comprising a first stage inverter and a second stage inverter, and wherein the second stage inverter comprising other stages except the first stage inverter.

10. The circuit as set forth in claim 9, further comprising a SRAM-like peripheral integrated for high-speed parallel readout to sample and output a PUF value at every rising clock edge from the timing control.

11. The circuit as set forth in claim 9, further comprising a plurality of NOR gates and multiple D-flip flops (FF), wherein the validity detector outputs a "1" from either of the D-FF if there is a PUF transition and outputs a "0" from the plurality of NOR gates if the evaluated PUF bit value is unstable.

12. The circuit as set forth in claim 9, further comprising supply voltages of each PUF cell's first stage and other stages and an external source, wherein the supply voltage of each PUF cell's first stage is controlled by the 8-bit DAC and the auto-zeroing comparator.

13. The circuit as set forth in claim 9, further comprising a coarse-fine locking process added before the skew input and the validity detector to enable self-checking using the self-checking controller.

14. The circuit as set forth in claim 9, further comprising a first capacitor, and a second capacitor to stabilize a dithered voltage resulted from a DAC value being dithered using a 4-bit pulse width modulation.

15. A non-transitory computer readable medium storing instructions, the instructions executable by a computer processor using a core numerical algorithm and comprising functionality for:
  controlling a skew input added to each PUF cell of a PUF array with sub-mV resolution;
  healing a portion of unstable bits of each PUF cells locally;
  performing a second self-checking on healed PUF cells to determine final PUF cells to discard; and
  performing at least one of a static operation mode, a dynamic operation mode, and a hybrid operation mode of Automatic Self Checking and Healing (ASCH) stabilization system based on design needs to reconfigure and mask the PUF array to achieve less than 1E-8 Bit Error Rate (BER) with less than 25% masking ratio.

* * * * *